（12）United States Patent
Suzuki et al.

(10) Patent No.: US 9,326,243 B2
(45) Date of Patent: Apr. 26, 2016

(54) WIRELESS COMMUNICATION SYSTEM, COMMUNICATION DEVICE AND COMMUNICATION METHOD

(71) Applicant: SHARP KABUSHIKI KAISHA, Osaka-shi, Osaka (JP)

(72) Inventors: Shoichi Suzuki, Osaka (JP); Tatsushi Aiba, Osaka (JP); Shohei Yamada, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/704,763

(22) Filed: May 5, 2015

(65) Prior Publication Data

US 2015/0237581 A1    Aug. 20, 2015

Related U.S. Application Data

(63) Continuation of application No. 13/682,334, filed on Nov. 20, 2012, now Pat. No. 9,055,571, which is a continuation of application No. 13/264,876, filed as application No. PCT/JP2010/002556 on Apr. 7, 2010, now Pat. No. 8,340,043.

(30) Foreign Application Priority Data

Apr. 24, 2009 (JP) ................................. 2009-106418

(51) Int. Cl.
H04W 4/00 (2009.01)
H04W 52/02 (2009.01)
H04W 72/04 (2009.01)
H04L 1/16 (2006.01)

(52) U.S. Cl.
CPC ......... H04W 52/0229 (2013.01); H04L 1/1671 (2013.01); H04W 72/042 (2013.01); H04W 72/0413 (2013.01)

(58) Field of Classification Search
CPC .................... H04W 52/0229; H04W 72/0413; H04W 72/042; H04L 1/1671
See application file for complete search history.

(56) References Cited

U.S. PATENT DOCUMENTS 8,498,649 B2    7/2013 Seo et al.
8,705,396 B2    4/2014 Ahn et al.
(Continued)

FOREIGN PATENT DOCUMENTS

EP    1 892 975 A1    2/2008
JP    2008-236018 A    10/2008
(Continued)

OTHER PUBLICATIONS

3GPP, "3rd Generation Partnership Project; Technical Specification Group Radio Access Network; Evolved Universal Terrestrial Radio Access (E-UTRA); Physical Layer Procedures (Release 8)", 3GPP TS 36.213 V8.6.0; Mar. 2009.
(Continued)

*Primary Examiner* — Clemence Han
(74) *Attorney, Agent, or Firm* — Birch, Stewart, Kolasch & Birch, LLP

(57) ABSTRACT

A mobile station (MS) receives one or more first physical downlink shared channels (PDSCH) on one or more first downlink component carriers and a plurality of second PDSCHs on a plurality of second downlink component carriers. The MS transmits, in a subframe, a first physical uplink channel with first ACK/NACK in a first uplink component carrier, the first ACK/NACK being provided for the one or more first PDSCHs received on the one or more first downlink component carriers, and a second physical uplink channel with second ACK/NACK in a second uplink component carrier, the second ACK/NACK being provided for the plurality of second PDSCHs received on the plurality of second downlink component carriers.

8 Claims, 24 Drawing Sheets

(56) References Cited

U.S. PATENT DOCUMENTS

| | | | |
|---|---|---|---|
| 8,792,436 | B2 | 7/2014 | Lee et al. |
| 2008/0225788 | A1 | 9/2008 | Inoue et al. |
| 2009/0276675 | A1 | 11/2009 | Ojala et al. |
| 2009/0296644 | A1 | 12/2009 | Cheon et al. |
| 2010/0098012 | A1* | 4/2010 | Bala ............... H04L 5/001 370/329 |
| 2010/0195575 | A1 | 8/2010 | Papasakellariou et al. |
| 2010/0195583 | A1 | 8/2010 | Nory et al. |
| 2010/0195624 | A1 | 8/2010 | Zhang et al. |
| 2010/0220668 | A1 | 9/2010 | Yamada et al. |
| 2010/0232373 | A1 | 9/2010 | Nory et al. |
| 2010/0254331 | A1 | 10/2010 | Kim et al. |
| 2010/0271970 | A1 | 10/2010 | Pan et al. |
| 2011/0128942 | A1 | 6/2011 | Kim et al. |
| 2011/0170514 | A1 | 7/2011 | Eriksson et al. |
| 2011/0205996 | A1 | 8/2011 | Kim et al. |
| 2011/0243088 | A1 | 10/2011 | Ahn et al. |
| 2011/0286411 | A1 | 11/2011 | Kim et al. |
| 2011/0317653 | A1 | 12/2011 | Kwon et al. |
| 2012/0051311 | A1 | 3/2012 | Kim et al. |
| 2012/0057551 | A1 | 3/2012 | Kim et al. |
| 2013/0178221 | A1 | 7/2013 | Jung et al. |
| 2014/0029545 | A1 | 1/2014 | Kim et al. |

FOREIGN PATENT DOCUMENTS

| | | |
|---|---|---|
| JP | 2009-49539 A | 3/2009 |
| WO | WO 2010/087674 A2 | 8/2010 |

OTHER PUBLICATIONS

3GPP, "3rd Generation Partnership Project; Technical Specification Group Radio Access Network; Further Advancements for E-UTRA; Physical Layer Aspects, (Release 9)", 3GPP TR 36.814, vol. 4.1, Feb. 2009.

European Search Report dated Jul. 16, 2012 for corresponding European Application 10766785.9.

Huawei, "PUCCH Design for Carrier Aggregation", 3GPP Draft, R1-091275, 3GPP TSG RAN WG1 Meeting #56bis, Seoul, Republic of Korea, Mar. 17, 2009, Mobile Competence Centre, 650, Route des Lucioles, F-06921 Sophia-Antipolis Cedex, France, pp. 1-8.

Internaitonal Search Report issued in International Application No. PCT/JP2010/002556 on May 18, 2010.

LG Electronics, "UCI Piggybacking on PUSCH in case of Transmit Power Limitation", 3GPP TSG RAN WG1 #56bis, Seoul, Korea, Mar. 17, 2009, R1-091205, Mobile Competence Centre, 650, Route des Lucioles, F-06921 Sophia-Antipolis Cedex, France, pp. 1-4.

Nokia Siemens Networks, Nokia, "UL control signalling to support bandwidth extension in LTE-Advanced", 3GPP TSG RAN WG1 Meeting #56, R1-090724, Feb. 9-13, 2009, Athens, Greece.

Qualcomm Europe, "Flexible Data and Reference Multiplexing for LTE-Advanced Uplink", 3GPP TSG-RAN WG1 #56bis, Mar. 23-27, 2009, Seoul, Korea.

Texas Instruments: "Considerations on Data and Control Multiplexing on PUSCH"; 3GPP TSG RAN WG1 #52; R1-080710; Sorento, Italy; Feb. 11-15, 2008; (retrieved Feb. 6, 2008); 3 pages.

U.S. Notice of Allowance issued in U.S. Appl. No. 13/264,876 on Aug. 27, 2012.

U.S. Notice of Allowance issued in U.S. Appl. No. 13/682,334 on Feb. 3, 2015.

U.S. Office Action issued in U.S. Appl. No. 13/682,334 on Sep. 9, 2014.

LG Electronics, Uplink control channel transmission for LTE-Advanced, 3GPP TSG RAN WG1 #56 R1-090656, 3GPP, Feb. 9, 2009 (5 pages).

* cited by examiner

FIG. 20

WIRELESS COMMUNICATION SYSTEM, COMMUNICATION DEVICE AND COMMUNICATION METHOD

This application is a Continuation of copending application Ser. No. 13/682,334, filed on Nov. 20, 2012, which is a Continuation of application Ser. No. 13/264,876, filed on Oct. 17, 2011, which was filed as PCT International Application No. PCT/JP2010/002556 on Apr. 7, 2010, which claims the benefit under 35 U.S.C. §119(a) to Patent Application No. 2009-106418, filed in Japan on Apr. 24, 2009, all of which are hereby expressly incorporated by reference into the present application.

TECHNICAL FIELD

The present invention relates to a wireless communication system, a communication device, a communication method, and a communication program.

Priority is claimed on Japanese Patent Application No. 2009-106418, filed Apr. 24, 2009, the content of which is incorporated herein by reference.

BACKGROUND ART

The 3GPP (3rd Generation Partnership Project) has considered radio access methods for cellular mobile communication and evolution of radio networks (hereinafter referred to as "LTE (Long Term Evolution)" or "EUTRA (Evolved Universal Terrestrial Radio Access)"), and radio access methods and radio networks which use broader frequencies to achieve faster data communication (hereinafter, referred to as "LTE-A (Long Term Evolution-Advanced)" or "A-EUTRA (Advanced Evolved Universal Terrestrial Radio Access)").

OFDM (Orthogonal Frequency Division Multiplexing), which is a multi-carrier transmission method, is used in LTE downlink. DFT (Discrete Fourier Transform)-Spread OFDM, which is a single-carrier transmission method, is used in uplink.

In LTE radio communication (downlink) from a base station device to a mobile station device, a physical broadcast channel (PBCH), a physical downlink control channel (PDCCH), a physical downlink shared channel (PDSCH), a physical multicast channel (PMCH), a physical control format indicator channel (PCFICH), and a physical hybrid automatic repeat request indicator channel (PHICH) are assigned. In radio communication (uplink) from a mobile station device to a base station device, a physical uplink shared channel (PUSCH), a physical uplink control channel (PUCCH), and a physical random access channel (PRACH) are assigned.

Compatibility with LTE has been required for LTE-A. In other words, it has been required for LTE-A that an LTE-A base station device wirelessly communicates with an LTE-A mobile station device and an LTE mobile station device at the same time. Additionally, it has been required for LTE-A that an LTE-A mobile station device wirelessly communicates with an LTE-A base station device and an LTE base station device. Further, it has been considered for LTE-A that the same channel structure as that of LTE is used.

For example, technique (referred to as spectrum aggregation, carrier aggregation, or frequency aggregation) has been proposed for LTE-A, in which multiple frequency bands having the same structure as of LTE (hereinafter, referred to as CC (Carrier Component or Component Carrier)) are used as one frequency band (broader frequency band).

Specifically, in communication using the carrier aggregation, a physical broadcast channel, a physical downlink control channel, a physical downlink shared channel, a physical multicast channel, a physical control format indicator channel, and a physical HARQ indicator channel are transmitted for each downlink carrier component. Additionally, a physical uplink shared channel, a physical uplink control channel, and a physical random access channel are assigned for each uplink carrier component. In other words, the carrier aggregation is a technique of simultaneously transmitting and receiving multiple data pieces and control information pieces in uplink and downlink by using the physical uplink control channels, the physical uplink shared channels, the physical downlink control channels, the physical downlink shared channels, and the like, those channels being provided for each of the carrier components (see section 5 of Non-Patent Document 1).

Regarding communication using the carrier aggregation, Non-Patent Document 2 discloses technique in which when physical uplink shared channels for a mobile station device are allocated to one of uplink carrier components, the mobile station device allocates all of uplink control information (UCI) pieces to the physical uplink shared channels and performs transmission. This technique is a technique for reducing transmission power of the mobile station device.

CITATION LIST

Non-Patent Document

[Non-Patent Document 1] "3GPP TR36.814 v0.4.1 (2009-02)", February, 2009.
[Non-Patent Document 2] "UL control signaling to support bandwidth extension in LTE-Advanced", 3GPP TSG RAN WG1 Meeting #56, R1-090724, Feb. 9-13, 2009.

DISCLOSURE OF THE INVENTION

Problems to be Solved by the Invention

It has been considered that a base station device allocates physical uplink shared channels to multiple uplink carrier components, for a mobile station device that transmits and receives a high volume of data.

However, when physical uplink shared channels of each of multiple uplink carrier components are assigned to a mobile station device, and if all uplink control information pieces are allocated to each of the uplink carrier components, there is a demerit in that the number of radio resources to be allocated with data information is reduced. Additionally, even if all the uplink control information pieces are allocated to any one of the uplink carrier components, the base station device cannot determine to which of the physical uplink shared channels the uplink control information is allocated, and therefore there is a demerit in that the base station device misjudges the kind of information allocated to the physical uplink shared channel.

The present invention has been made in consideration of the above situations. An object of the present invention is to provide a wireless communication system, a communication device, a communication method, and a communication program, which can reliably communicate information.

Means for Solving the Problems (1) The present invention has been made to solve the above problems. The present invention is a wireless communication system including: a first communication device; and a second communication device that communicates with the first communication device. The second communication device assigns, to the first communication device, a plurality of radio resources for a plurality of transport blocks. When transmission of uplink control information is necessary, the first communication device allocates the uplink control information to one of the plurality of radio resources assigned and transmits the uplink control information. The second communication device demultiplexes the uplink control information allocated to the one of the plurality of radio resources.

According to the above configuration, the wireless communication system can reliably transmit and receive information.

(2) In the wireless communication system according to the present invention, the one of the plurality of radio resources which is to be allocated with the uplink control information is a radio resource of a component carrier, which is selected and notified to the first communication device by the second communication device.

(3) In the wireless communication system according to the present invention, the one of the plurality of radio resources which is to be allocated with the uplink control information is selected by the first communication device based on a plurality of downlink control information pieces with respect to respective ones of the plurality of radio resources, the downlink control information pieces being notified by the second communication device.

(4) In the wireless communication system according to the present invention, each of the plurality of downlink control information pieces includes information concerning a modulation scheme.

(5) In the wireless communication system according to the present invention, each of the plurality of downlink control information pieces includes information concerning an encoding rate.

(6) In the wireless communication system according to the present invention, each of the plurality of downlink control information pieces includes information concerning an amount of radio resources.

(7) In the wireless communication system according to the present invention, each of the plurality of downlink control information pieces includes information concerning an amount of transport blocks.

(8) In the wireless communication system according to the present invention, the one of the plurality of radio resources which is to be allocated with the uplink control information is selected by the first communication device based on values of frequencies of the plurality of radio resources.

(9) The present invention is a first communication device that wirelessly communicates with a second communication device. When transmission of uplink control information is necessary, the first communication device allocates the uplink control information to one of a plurality of radio resources assigned by the second communication device, and transmits the uplink control information.

(10) The present invention is a second communication device that wirelessly communicates with a first communication device. The second communication device assigns a plurality of radio resources to the first communication device. The second communication device receives and demultiplexes uplink control information transmitted from the first communication device, the uplink control information being allocated by the first communication device to one of the plurality of radio resources assigned.

(11) The present invention is a communication method for a first communication device that wirelessly communicates with a second communication device. The communication method includes: a step of the first communication device allocating, when transmission of uplink control information is necessary, the uplink control information to one of a plurality of radio resources assigned by the second communication device, and transmitting the uplink control information.

(12) The present invention is a communication method for a second communication device that wirelessly communicates with a first communication device. The communication method includes: a step of the second communication device assigning a plurality of radio resources to the first communication device; and a step of the second communication device receiving and demultiplexing uplink control information transmitted from the first communication device, the uplink control information being allocated by the first communication device to one of the plurality of radio resources assigned.

(13) The present invention is a communication program for a first communication device that wirelessly communicates with a second communication device. The communication program causes a computer of the first communication device to function as: a means that allocates, when transmission of uplink control information is necessary, uplink control information to one of a plurality of radio resources assigned by the second communication device, and transmits the uplink control information.

(14) The present invention is a communication program for a second communication device that wirelessly communicates with a first communication device. The communication method causes a computer of the second communication device to function as: a means that assigns a plurality of radio resources to the first communication device; and a means that receives and extracts uplink control information transmitted from the first communication device, the uplink control information being allocated by the first communication device to one of the plurality of radio resources assigned.

Effects of the Invention

According to the present invention, a wireless communication system can reliably communicate information.

BRIEF DESCRIPTION OF THE DRAWINGS

FIG. 20 illustrates an example of a structure of physical uplink shared channels according to the fourth embodiment.

BEST MODE FOR CARRYING OUT THE INVENTION

First Embodiment

Figure 1:
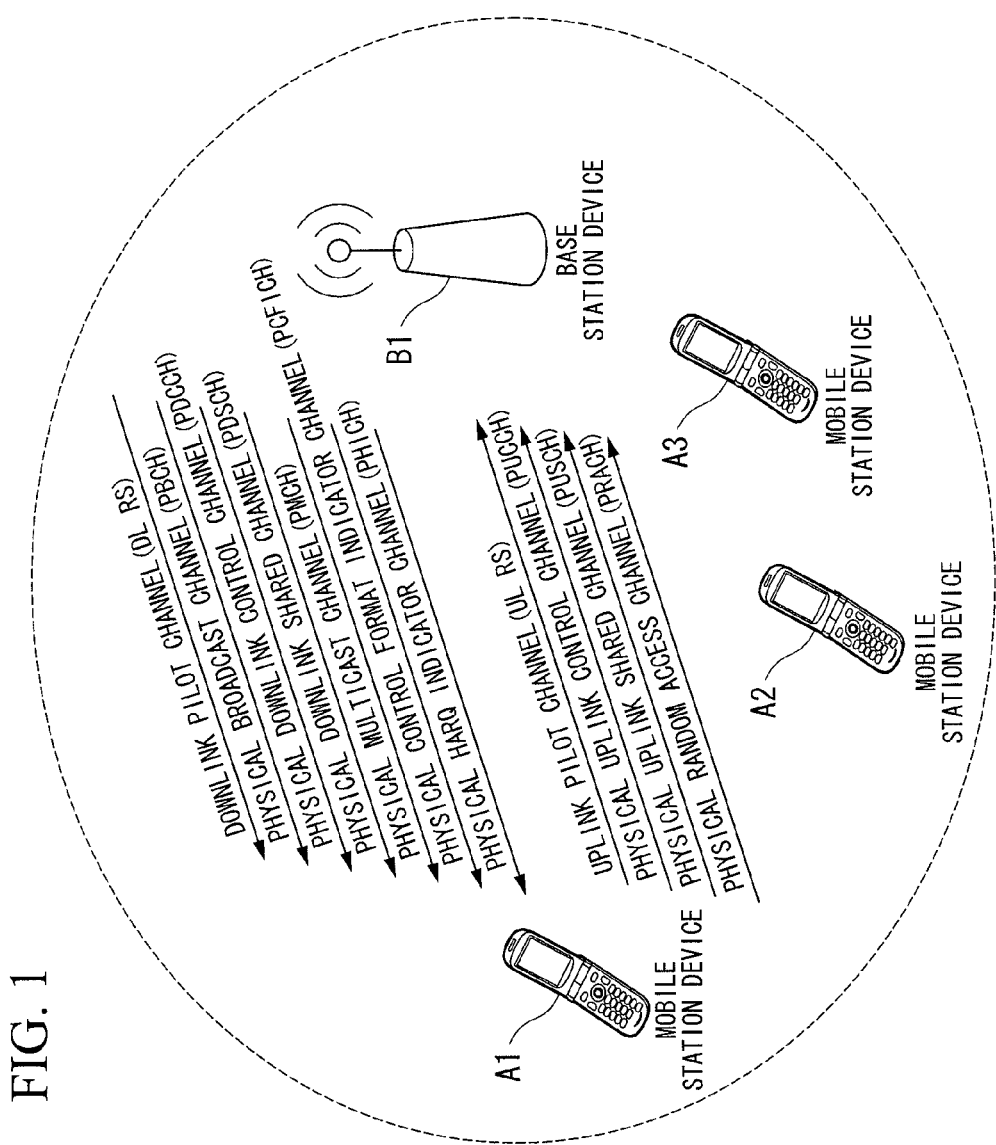
FIG. 1 is a conceptual diagram illustrating a wireless communication system according to a first embodiment of the present invention.

Hereinafter, a first embodiment of the present invention is explained with reference to accompanying drawings.
(Wireless Communication System)
FIG. 1 is a conceptual diagram illustrating a wireless communication system according to the first embodiment of the present invention. In FIG. 1, the wireless communication system includes mobile station devices (first communication devices) A1 to A3, and a base station device (second communication device) B1. The mobile station devices A1 to A3 and the base station device B1 perform communication using carrier aggregation as will be explained later.

FIG. 1 shows that a downlink pilot channel (also referred to as "downlink reference signal (DL RS)"), a physical broadcast channel (PBCH), a physical downlink control channel (PDCCH), a physical downlink shared channel (PDSCH), a physical multicast channel (PMCH), a physical control format indicator channel (PCFICH), and a physical hybrid ARQ indicator channel (PHICH) are assigned for wireless communication (downlink) from the base station device B1 to the mobile station devices A1 to A3. FIG. 1 also shows that an uplink pilot channel (also referred to as "uplink reference signal (UL RS)"), a physical uplink control channel (PUCCH), a physical uplink shared channel (PUSCH), and a physical random access channel (PRACH) are assigned for wireless communication (uplink) from the mobile station devices A1 to A3 to the base station device B1.

Figure 2:
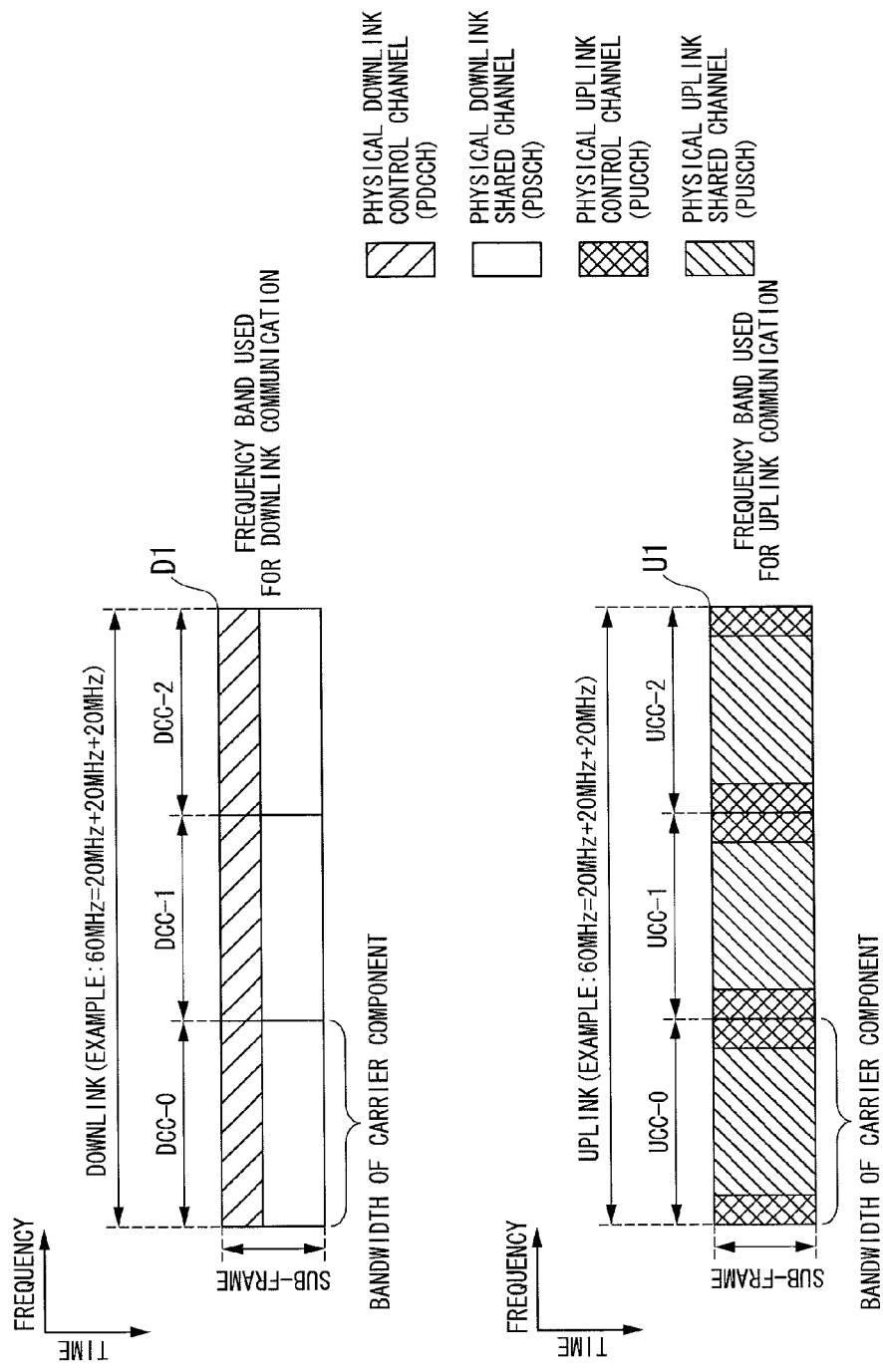
FIG. 2 illustrates an example of a carrier aggregation process according to the first embodiment.

Hereinafter, the mobile station devices A1 to A3 are referred to as a mobile station device a1, and the base station device is referred to as a base station device b1.
(Carrier Aggregation)
FIG. 2 illustrates an example of a carrier aggregation process according to the first embodiment. In FIG. 2, a horizontal axis denotes a frequency domain, and a vertical axis denotes a time domain.

As shown in FIG. 2, a downlink sub-frame D1 includes three carrier components DCC (Downlink Component Carrier)-0, DCC-1, and DCC-2, each of which has a bandwidth of 20 MHz. In the sub-frame of each of the respective carrier components in downlink (hereinafter referred to as downlink carrier components), a physical downlink control channel denoted by a region hatched with diagonal lines falling from top left to bottom right, and a physical downlink shared channel denoted by a non-hatched region are time-multiplexed to be allocated.

On the other hand, an uplink sub-frame U1 includes three carrier components UCC (Uplink Component Carrier)-0, UCC-1, and UCC-2, each of which has a bandwidth of 20 MHz. In the sub-frame of each of the respective carrier components in uplink (hereinafter referred to as uplink carrier components), a physical uplink control channel denoted by a region hatched with diagonal lines crossing in a grid manner, and a physical uplink shared channel denoted by a region hatched by diagonal lines rising from bottom left to top right are frequency-multiplexed to be allocated. Hereinafter, the number n of UCC-n (n=0, 1, 2) is referred to as the carrier component number n.

Figure 3:
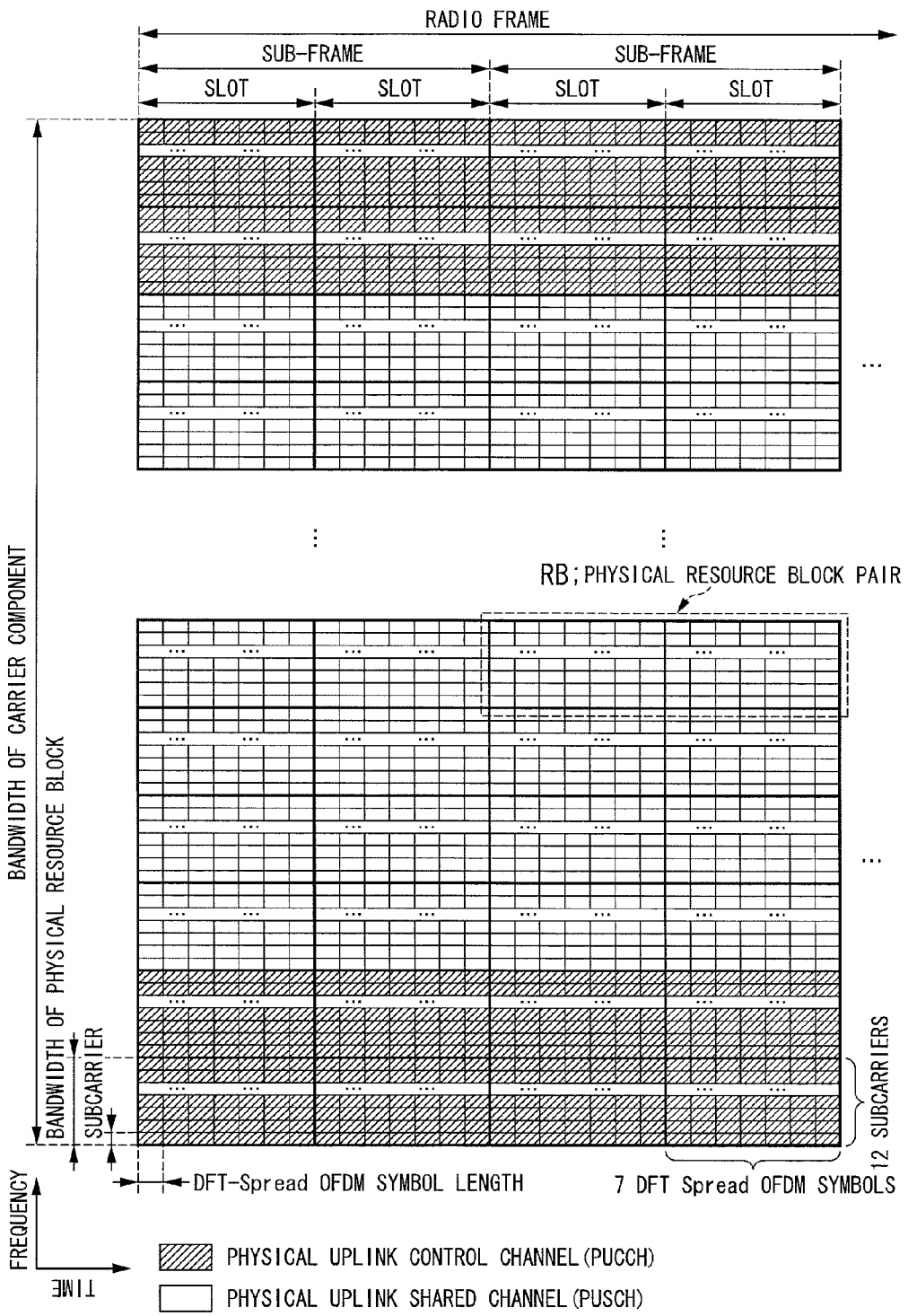
FIG. 3 is a schematic view illustrating an example of a structure of an uplink radio frame according to the first embodiment.

For example, the base station device b1 allocates, in a sub-frame, signals to one or more physical downlink shared channels of respective one or more of the three downlink carrier components, and transmits the signals to the mobile station device a1. The mobile station device a1 allocates, in a sub-frame, signals to one or more physical uplink shared channels of respective one or more of the three uplink carrier components, and transmits the signals to the base station device b1.
(Uplink Radio Frame)
FIG. 3 is a schematic diagram illustrating an example of a structure of an uplink radio frame according to the first embodiment. FIG. 3 illustrates a structure of a radio frame with respect to an uplink carrier component. In FIG. 3, a horizontal axis denotes a time domain, and a vertical axis denotes a frequency domain.

As shown in FIG. 3, a radio frame with respect to an uplink carrier component includes multiple physical resource block (PRB) pairs (for example, a region enclosed by a dashed line allocated with a reference symbol RB). The physical resource block pair is a unit of radio resource assignment, and is defined by a predetermined frequency band (PRB bandwidth) and a predetermined time band (two slots=one sub-frame).

One physical resource block pair includes two physical resource blocks (PRB bandwidth×slot) sequentially arranged in the time domain. One physical resource block (a unit enclosed by a heavy line shown in FIG. 3) includes 12 subcarriers in the frequency domain and 7 DFT-Spread OFDM symbols in the time domain.

In the time domain, a slot includes 7 DFT-Spread OFDM symbols, a sub-frame includes 2 slots, and a radio frame includes 10 sub-frames. In the frequency domain, multiple physical resource blocks (PRB) are arranged according to the bandwidth of the uplink carrier component. A unit defined by one subcarrier and one DFT-Spread OFDM symbol is referred to as a resource element (RE).

Hereinafter, channels to be allocated in a radio frame are explained.

For example, a physical uplink control channel, a physical uplink shared channel, an uplink pilot channel to be used for channel estimation for the physical uplink control channel and the physical uplink shared channel are allocated in each uplink sub-frame.

Physical uplink control channels are allocated to physical resource block pairs at both ends of the bandwidth of the uplink carrier component (regions hatched by diagonal lines rising from bottom left to top right).

Physical uplink shared channels are allocated to physical resource block pairs (non-hatched regions) other than those allocated with physical uplink control channels. The mobile station device a1 does not allocate, in one sub-frame, data onto both a physical uplink control channel and a physical uplink shared channel.

An uplink pilot channel (not shown) is time-multiplexed with a physical uplink shared channel and a physical uplink control channel, to be allocated.

Hereinafter, a signal allocated to a physical uplink control channel is explained.

A physical uplink control channel is allocated with a signal including an uplink control information that is information used for controlling communication, such as channel quality information, a scheduling request (SR), and ACK/NACK (ACKnowledgment/Negative-ACKnowledgment).

The channel quality information is information indicating channel quality of a downlink channel, which is measured by the mobile station device a1 from a downlink reference signal. The scheduling request is information for the mobile station device a1 to request the base station device b1 to assign uplink radio resources. The ACK/NACK is information indicating success or failure of decoding a physical downlink shared channel received by the mobile station device.

The channel quality information includes CQI (Channel Quality Indicator), RI (Rank Indicator), and PMI (Precoding Matrix Indicator). CQI is information indicating channel quality for changing radio transmission parameters, such as an error correction scheme for a downlink channel, an encoding rate of error correction, and a data modulation level. RI is information which the mobile station device a1 requests when performing spatial-multiplexing MIMO (Multiple Input Multiple Output) transmission, and which indicates the number (rank) of units (streams) of signal streams to be subjected to a pre-process that is performed in advance on transmission signal streams. PMI is information which the mobile station device a1 requests when performing spatial-multiplexing MIMO transmission, and is information concerning pre-coding included in the pre-process that is performed in advance on transmission signal streams.

Hereinafter, a signal allocated to a physical uplink shared channel is explained.

A physical uplink shared channel is allocated with a signal including data information (transport block) (referred to as data signals) that is information other than uplink control information. In the first embodiment, when a physical uplink shared channel is allocated, a signal including uplink control information (also referred to as uplink control signals) are also allocated to the physical uplink shared channel.

Hereinafter, allocation of uplink control signals to a physical uplink shared channels is explained.
(Physical Uplink Shared Channel)

Figure 4:
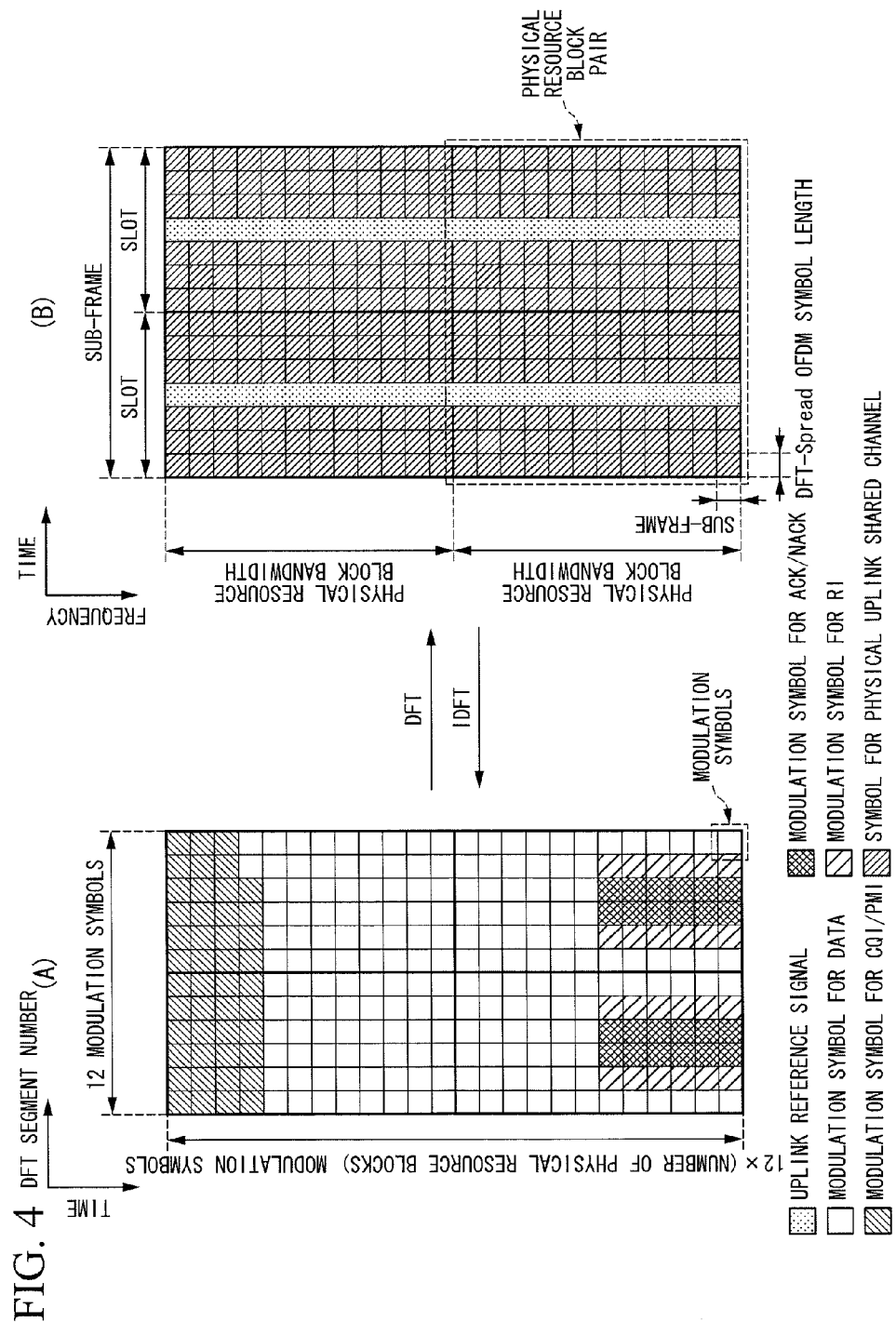
FIG. 4 is a schematic view illustrating an example of allocation of uplink control signals to physical uplink shared channels according to the first embodiment.

FIG. 4 is a schematic diagram illustrating an example of allocation of uplink control signals onto a physical uplink shared channel according to the first embodiment. In FIG. 4, FIG. 4A illustrates mapping of uplink control signals, and FIG. 4B illustrates allocation of uplink control signals onto a physical uplink shared channel. FIG. 4B shows one physical uplink shared channel with respect to an uplink carrier component assigned to the mobile station device a1 in one sub-frame, and shows a case where two physical resource block pairs are allocated as the physical uplink shared channel.

In FIG. 4A, a vertical axis denotes a time domain, and each column denotes a segment that is a unit for DFT (DFT segment). A horizontal axis denotes DFT segment numbers allocated in order of time. FIG. 4A shows that there are divided regions in the direction of the horizontal axis, the number of which is equal to the number of DFT-Spread OFDM symbols included in a physical uplink shared channel that can be transmitted by a sub-frame after DFT (12 pieces in the case of FIG. 4B), and shows that modulation symbols (signals) are allocated to the regions. Additionally, FIG. 4A shows that there are divided regions in the direction of the vertical axis, the number of which is equal to the number of subcarriers allocated to the sub-frame (24 pieces in the case of FIG. 4B), and shows that modulation symbols are allocated to the regions.

The regions shown in FIG. 4A, which are hatched with diagonal lines crossing in a grid manner, are regions to be allocated with modulation symbols for ACK/NACK. The modulation symbols for ACK/NACK are allocated at the third, fourth, ninth, and tenth regions counted in the DFT-segment-number-increasing direction from a region allocated with the smallest DFT segment number, and at six sequential regions counted in the time-decreasing direction from a region positioned at the largest time. The regions shown in FIG. 4A, which are hatched with diagonal lines falling from top left to bottom right, denote regions allocated with modulation symbols for RI. The modulation symbols for RI are allocated at the second, fifth, eighth, and eleventh regions counted in the DFT-segment-number-increasing direction from the region allocated with the smallest DFT segment number, and at six sequential regions counted in the time-decreasing direction from the region positioned at the largest time.

The regions shown in FIG. 4A, which are hatched with diagonal lines rising from bottom left to top right, denote regions allocated with modulation symbols for CQI or PMI. The modulation symbols for CQI or PMI are sequentially allocated to the row of regions positioned at the smallest time, in the DFT-segment-number increasing direction from the region allocated with the smallest DFT segment number. When all the regions positioned in the row of regions positioned at the smallest time are allocated with modulation symbols for CQI or PMI, following modulation symbols for CQI or PMI are sequentially allocated to the next row of regions positioned at the second smallest time, in the DFT-segment-number-increasing direction from the region allocated with the smallest DFT segment number. FIG. 4A shows that as a result of repeating a similar allocation process, modulation symbols for CQI or PMI are allocated up to the tenth region counted in the DFT-segment-number-increasing direction from a region allocated with the smallest DFT number which is positioned in the fourth row of regions counted in the time-increasing direction from the region positioned at the smallest time.

The non-hatched regions shown in FIG. 4A denote regions to be allocated with modulation symbols for data information. The modulation symbols for data information are allocated in a similar manner to the modulation symbols for CQI and PMI after all the modulation symbols for CQI and PMI are allocated. After all the modulation symbols for data information are allocated, however, part of the modulation symbols for data information are overwritten by modulation symbols for ACK/NACK and RI.

In FIG. 4B, a horizontal axis denotes a time domain, and a vertical axis denotes a frequency domain. The regions hatched with diagonal lines falling from top left to bottom right denote symbols allocated to the physical uplink shared channel. The regions hatched with dots denote uplink reference signals.

The symbols allocated to the physical uplink shared channel are modulation symbols obtained by performing DFT (Discrete Fourier Transform) on the modulation symbols allocated as shown in FIG. 4A. Specifically, in the case of FIG. 4B, the modulation symbols shown in FIG. 4A are subjected to DFT sequentially from the time domain (column) allocated with the smallest DFT segment number, and then frequency-domain symbols generated by the DFT are sequentially arranged in order according to time.

(Configuration of Mobile Station Device a1)

Figure 5:
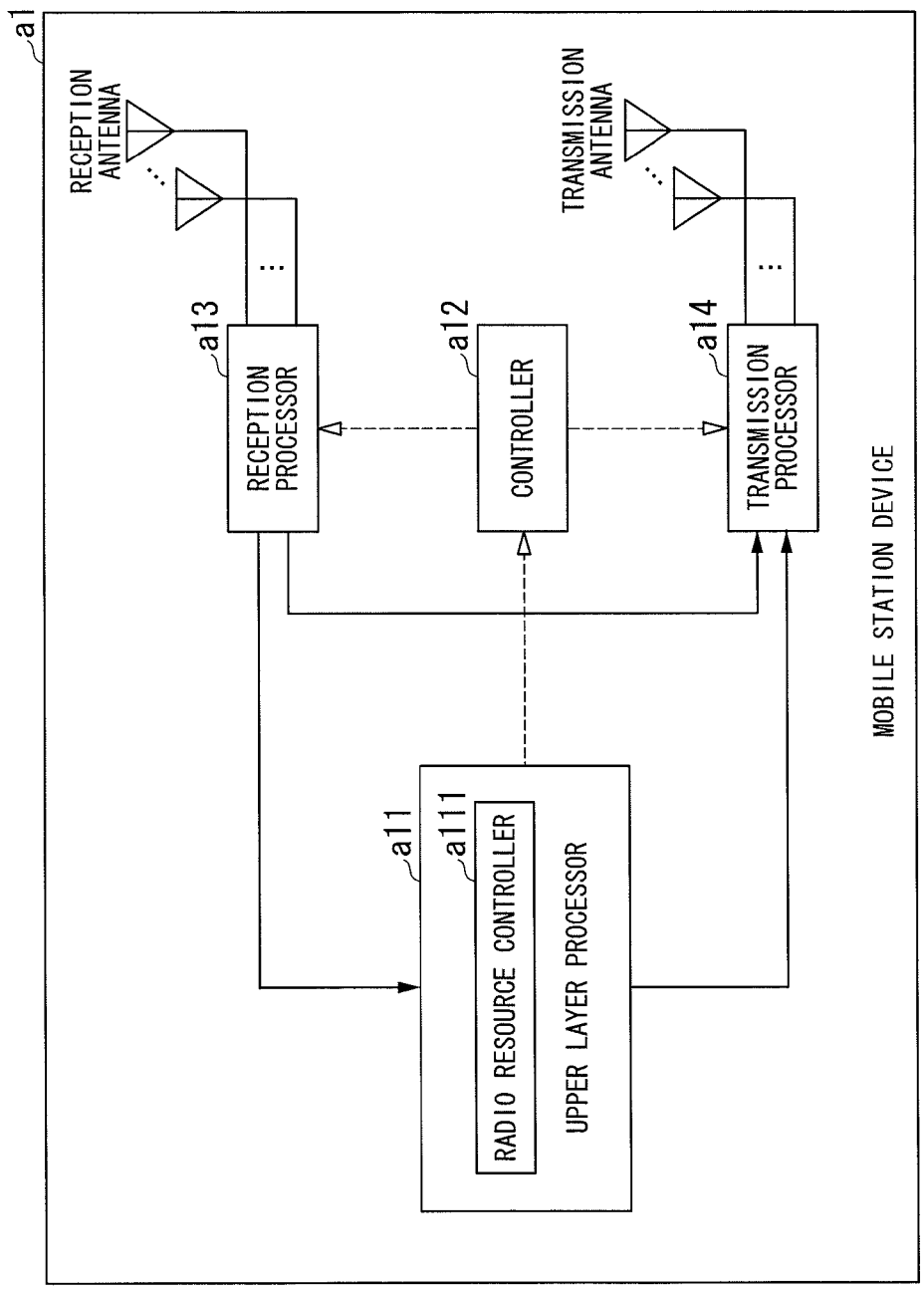
FIG. 5 is a schematic block diagram illustrating a configuration of a mobile station device according to the first embodiment.

FIG. 5 is a schematic block diagram illustrating a configuration of the mobile station device according to the first embodiment. As shown in FIG. 5, the mobile station device a1 includes an upper layer processor a11, a controller a12, a reception processor a13, multiple reception antennas, a transmission processor a14, and multiple transmission antennas. The upper layer processor a11 includes a radio resource controller a111. Although the reception antenna is configured to be separated from the transmission antenna in the case of FIG. 5, these antennas may be shared by using a thyristor that switches an input and an output of a signal.

The upper layer processor a11 outputs, to the transmission processor a14, data information for each uplink component, which is generated by user operation or the like. The upper layer processor a11 processes a packet data convergence protocol (PDCP) layer, a radio link control (RLC) layer, and a radio resource control (RRC) layer.

In the above process, the radio resource controller a111 included in the upper layer processor a11 manages various setting information of the mobile station device a1, a state of communication, and a state of buffer. The radio resource controller a111 generates information pieces to be allocated to respective channels of each uplink carrier component, and outputs generated information pieces to the transmission processor a14 for each uplink carrier component. For example, the radio resource controller a111 generates ACK/NACK in response to data on a physical downlink shared channel according to the result of an HARQ (Hybrid Automatic Repeat Request) process. Then, the radio resource controller a111 outputs the generated ACK/NACK to the transmission processor a14. HARQ is technique in which the mobile station device a1 transmits success or failure (ACK/NACK) of decoding to the base station device b1, the base station device b1 retransmits the signal when the decoding fails due to errors (in the case of NACK), and then the mobile station device a1 decodes a multiplexed signal including the already-received signal and the secondary-received signal.

The radio resource controller a111 generates control information for controlling the reception processor a13 and the transmission processor a14, based on the downlink control information notified by the base station device b1 through a physical downlink control channel. Then, the radio resource controller a111 outputs the generated control information to the controller a12. For example, the radio resource controller a111 outputs, to the controller a12, shared channel assignment information indicating an uplink carrier component allocated with physical uplink shared channels for the mobile station device a1. Additionally, for example, when to allocate signals onto a physical uplink shared channel, the radio resource controller a111 reads out from a storing unit (not shown), mapping information that orders to perforin mapping as shown in FIG. 4, and outputs the mapping information to the controller a12. The mapping information may be previously stored at the time of manufacturing the mobile station device a1 or at the time of updating software. Alternatively, the mapping information may be previously stored when the mapping information is notified by the base station device b1.

Based on the control information received from the upper layer processor a11, the controller a12 generates a control signal that controls the reception processor a13 and the transmission processor a14. Among the generated control signals, a control signal generated based on the shared channel assignment information is referred to as a shared channel assignment information signal. The shared channel assignment information signal is one or more of the numbers n (n=0, 1, 2) of upper carrier components allocated with physical uplink shared channels, or "9" which indicates that no physical uplink shared channel is allocated.

The controller a12 outputs the generated control signal to the reception signal a13 and the transmission processor a14, and thus controls the reception processor a13 and the reception processor a14.

According to the control signal received from the controller a12, the reception processor a13 demodulates and decodes reception signals received from the base station device b1 through the reception antennas. The reception processor a13 outputs the decoded information to the upper layer processor a11. The reception processor a13 generates channel quality information (CQI/PMI/RI) based on the channel quality or the like of the detected downlink pilot signal. Then, the reception processor a13 outputs the generated channel quality information to the transmission processor a14.

The transmission processor a14 generates an uplink reference signal according to the control signal received from the controller a12. The transmission processor a14 encodes and modulates the date information and ACK/NACK which are received from the upper layer processor a11, and the channel quality information received from the reception processor a13, to generate modulation symbols.

The transmission processor a14 allocates the generated modulation symbols onto a physical uplink shared channel and a physical uplink control channel, multiplexes the allocated modulation symbols with the generated uplink reference signal, and then transmits the multiplexed signals to the base station device b1 through the transmission antennas.

At the time of the allocation of the modulation symbols, the transmission processor a14 allocates the uplink control information onto a physical uplink shared channel, as shown in FIG. 4. When there are multiple uplink carrier components allocated with physical uplink shared channels for mobile station device a1, the transmission processor a14 selects an uplink carrier component according to a predetermined allocation rule, and allocates the uplink control information onto the physical uplink shared channel of the selected uplink carrier component.

Hereinafter, the transmission processor a14 is explained in detail.

(Configuration of Transmission Processor a14)

Figure 6:
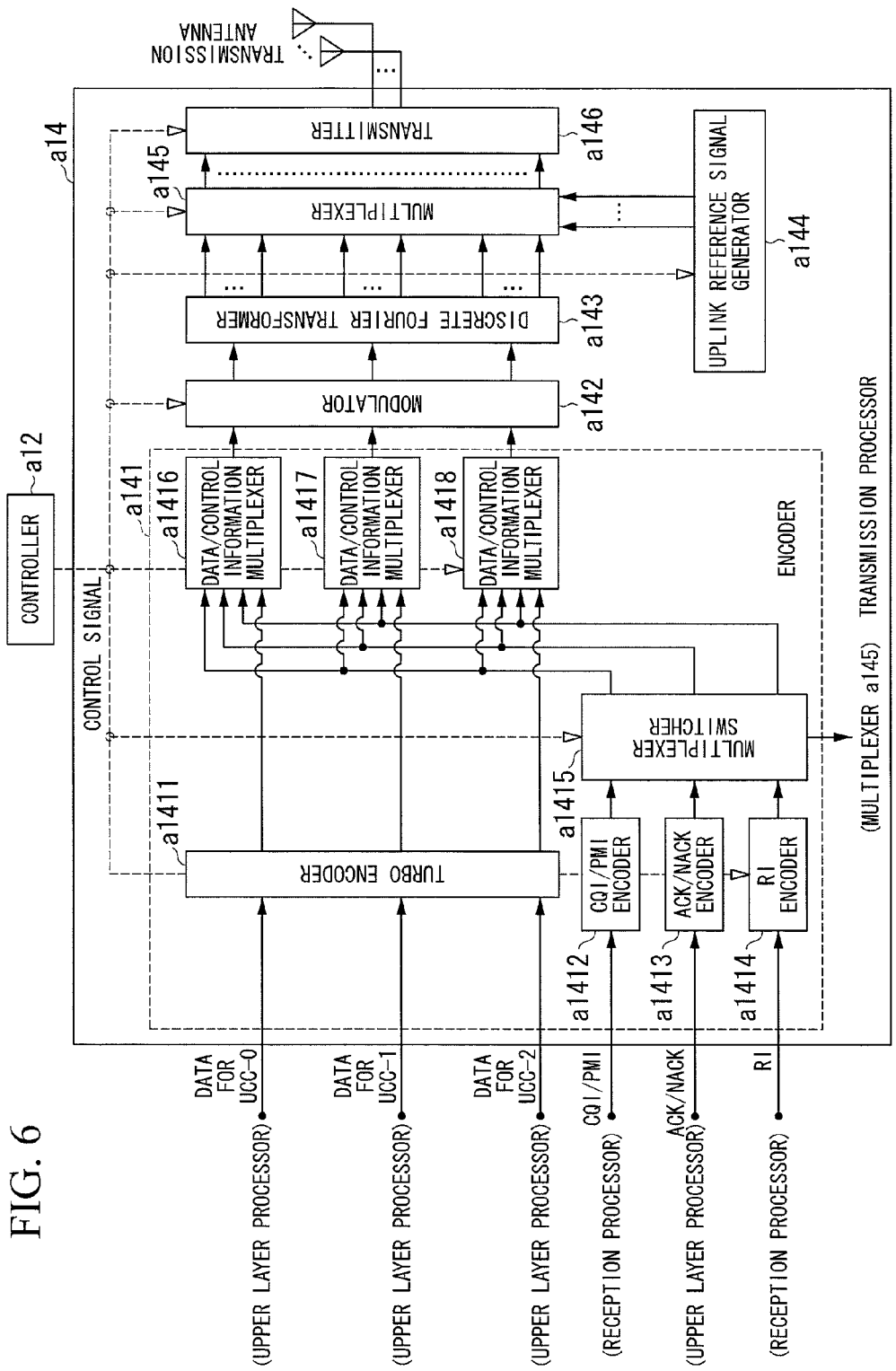
FIG. 6 is a schematic block diagram illustrating a configuration of a transmission processor of a mobile station device according to the first embodiment.

FIG. 6 is a schematic block diagram illustrating a configuration of the transmission processor a14 of the mobile station device according to the first embodiment. As shown in FIG. 6, the transmission processor a14 includes an encoder a141, a modulator a142, a discrete Fourier transformer a143, an uplink reference signal generator a144, a multiplexer a145, and a transmitter a146. The encoder a141 includes a turbo encoder a1411, a CQI/PMI encoder a1412, an ACK/NACK encoder a1413, an RI encoder a1414, a multiplexer switcher (carrier component selector) a1415, and data/control information multiplexers a1416 to a1418. FIG. 6 illustrates a case where three uplink carrier components are used to communicate with the base station device b1, as shown in FIG. 2. Each unit of the transmission processor a14 operates according to a control signal received from the controller a12.

The turbo encoder a1411 performs turbo error correction encoding on data information pieces for respective uplink carrier components which are received from the upper layer processor a11, with respective encoding rates notified by the base station device b1, and thus generates encoded bits (also referred to as data encoded bits). The turbo encoder a1411 outputs the generated data encoded bits for the respective uplink carrier components to the data/control information multiplexers a1416 to a1418 associated with the respective uplink carrier components. When CQI/PMI is multiplexed with a physical uplink shared channel, the turbo encoder a1411 performs turbo error correction encoding so as to reduce the number of data encoded bits by the encoded bits for the CQI/PMI.

The CQI/PMI encoder a1412 performs error correction encoding on the CQI/PMI received from the reception transmitter a14, based on the shared channel assignment information signal received from the controller a12, and thus generates encoded bits for CQI/PMI. The CQI/PMI encoder a1412 outputs the generated encoded bits (referred to as CQI/PMI encoded bits) to the multiplexer switcher a1415.

The ACK/NACK encoder a1413 performs error correction encoding on the ACK/NACK received from the upper layer processor a1413, based on the shared channel assignment information signal received from the controller a12. Then, the ACK/NACK encoder a1413 outputs the generated encoded bits (referred to as ACK/NACK encoded bits) to the multiplexer switcher a1415.

The RI encoder a1414 performs error correction encoding on the RI received from the reception processor a14, based on the shared channel assignment information signal received from the controller a12. Then, the RI encoder a1412 outputs the generated encoded bits (referred to as RI encoded bits) to the multiplexer switcher a1415.

The CQI/PMI encoder a1412, the ACK/NACK encoder a1413, and the RI encoder a1414 switch error correction encoding between when the shared channel assignment information signal indicates "9," that is when it is determined that no physical uplink shared channel is allocated to the mobile station device a1, and when the shared channel assignment information signal indicates one or more of the uplink subcarrier component numbers n (n=0, 1, 2), that is when it is determined that one or more physical uplink shared channels are assigned to the mobile station device. In other words, the CQI/PMI encoder a1412, the ACK/NACK encoder a1413, and the RI encoder a1414 perform different error correction encoding processes based on whether the encoded bits are transmitted on a physical uplink control channel or a physical uplink shared channel.

Based on the shared channel assignment information signal received from the controller a12, the multiplexer switcher a1415 performs a control information allocation switching process that redirects the outputs of the encoded bits received from the CQI/PMI encoder a1412, the ACK/NACK encoder a1413, and the RI encoder a1414.

Hereinafter, the control information allocation switching process performed by the multiplexer switcher a1415 is explained.

When the shared channel assignment information signal indicates "9," that is when it is determined that no physical uplink shared channel is assigned to the mobile station device a1, the multiplexer switcher a1415 determines to output the encoded bits to the multiplexer a145. In this case, the output encoded bits are modulated by a modulator (not shown), and are allocated by the multiplexer a145 to a physical uplink control channel.

On the other hand, when the shared channel assignment information signal indicates one of the uplink carrier component number n (n=0, 1, 2), that is when it is determined that the number of uplink carrier components respectively allocated with physical uplink shared channels for the mobile station device a1 is one, the multiplexer switcher a1415 determines to output the encoded bits to one of the data/control information multiplexers a1416 to a1418 which is associated with the uplink carrier component allocated with the physical uplink shared channel.

When the shared channel assignment information signal indicates two or more of the uplink carrier component numbers n (n=0, 1, 2), that is when it is determined that the number of uplink carrier components respectively allocated with physical uplink shared channels for the mobile station device a1 is two or more, the multiplexer switcher a1415 determines where to output the encoded bits, according to a predetermined allocation rule as follows.

In the first embodiment, the multiplexer switcher a1415 first selects the largest uplink carrier component number n among multiple uplink carrier component numbers n indicated by the shared channel assignment information signal. Then, the multiplexer switcher a1415 determines to output the encoded bits to one of the data/control information multiplexers a1416 to a1418, which is associated with the uplink carrier component allocated with the selected uplink carrier component number n. In other words, the multiplexer switcher a1415 selects a carrier component among multiple carrier components allocated with radio resources.

The multiplexer switcher a1415 outputs the encoded bits to the output determined by the control information allocation switching process.

The data/control information multiplexers a1416 to a1418 are associated with uplink components allocated with the uplink carrier numbers 0 to 2, respectively. Each of the data/control information multiplexers a1416 to a1418 rearranges encoded bits of signals to be allocated to the associated one of the uplink carrier components. The data/control information multiplexers a1416 to a1418 have the same functions, and therefore one of the data/control information multiplexers a1416 to a1418 (data/control information multiplexers a1418) is explained here.

The data/control information multiplexer a1418 rearranges the data encoded bits received from the turbo encoder a1411 and the encoded bits received from the multiplexer switcher a1415 as follows. Firstly, the data/control information multiplexer a1418 adds the data encoded bits to the end of the CQI/PMI encoded bits. Then, the data/control information multiplexer a1418 writes the ACK/NACK encoded bits and RI encoded bits over the data encoded bits according to the allocation shown in FIG. 4A.

The data/control information multiplexer a1418 outputs to the modulation unit a142, the encoded bits, the order of which have been rearranged. When encoded bits are not received from the multiplexer switcher a1415, the data/control information multiplexer a1418 does not insert the CQI/PMI encoded bits, the ACK/NACK encoded bits, and the RI encoded bits, and outputs only the data encoded bits to the modulation unit a142. In other words, the data/control information multiplexer a1418 allocates uplink control information onto radio resources of the uplink carrier component selected by the multiplexer switcher a1415.

The modulator a142 modulates the encoded bits for the uplink carrier components which are respectively received from the data/control information multiplexers a1416 to a1418 by any one of modulation schemes, such as QPSK (Quadrature Phase Shift Keying), 16QAM (16 Quadrature Amplitude Modulation), 64QAM (64 Quadrature Amplitude Modulation), of which the base station device b1 notifies the mobile station device a1, and thus generates signals of modulation symbols.

The modulator 142 outputs the generated signals for the respective carrier components to the discrete Fourier transformer a143.

The discrete Fourier transformer a143 rearranges in parallel, the signals for the respective uplink carrier components, which are received from the modulator a142, as shown in FIG. 4A. The discrete Fourier transformer a143 performs discrete Fourier transform on the rearranged signals to generate frequency-domain signals. The discrete Fourier transformer a143 outputs the generated signals for the respective uplink carrier components to the multiplexer a145.

The uplink reference signal generator a144 generates, for each of the uplink carrier components, a stream signal (uplink reference signal) that is known to the mobile station device a1 and the base station device b1. The uplink reference signal is generated based on a mobile station ID of the mobile station device a1 and a base station ID of the base station device b1.

The uplink reference signal generator a144 outputs the generated uplink reference signal to the multiplexer a145.

The multiplexer a145 allocates the signals for the respective carrier components which are received from the discrete Fourier transformer a143 and the uplink reference signal received from the uplink reference signal generator a145 to resource elements for physical uplink shared channels assigned by the base station devices b1 (see FIG. 4B). The multiplexer a145 outputs the allocated signals for the respective carrier components to the transmitter a146.

When receiving signals of the modulated encoded bits from the multiplexer switcher a1415, the multiplexer a145 allocates the received signals to a physical uplink control channel.

The transmitter a146 performs IFFT (Inverse Fast Fourier Transform) on the frequency-domain signals received from the multiplexer a145 to generate DFT-Spread OFDM symbols. The DFT-Spread OFDM symbols are OFDM symbols generated by allocating frequency-domain signals converted by Fourier transform from the time-domain signal (this conversion being performed by the discrete Fourier transformer a143 in the first embodiment) onto different frequencies (this allocation being performed by the multiplexer a145), and performing inverse Fourier transform thereon.

The transmitter a146 adds a guard interval (GI) to the generated DFT-Spread OFDM symbols to generate a baseband digital signal. The transmitter a146 converts the generated digital signal into an analog signal. Then, the transmitter a146 generates, from the analog signal, an in-phase component and an orthogonal component of an intermediate frequency. Then, the transmitter a146 removes extra frequency components with respect to the intermediate frequency band. Then, the transmitter a146 converts (upconverts) the intermediate-frequency signals into high-frequency signals. Then, the transmitter a146 removes extra frequency components from the high-frequency signals. Then, the transmitter a146 performs power amplification on the high-frequency signals. Then, the transmitter a146 outputs the amplified high-frequency signals to the respective transmission antennas, and thus performs transmission.

(Configuration of Base Station Device b1)

Figure 7:
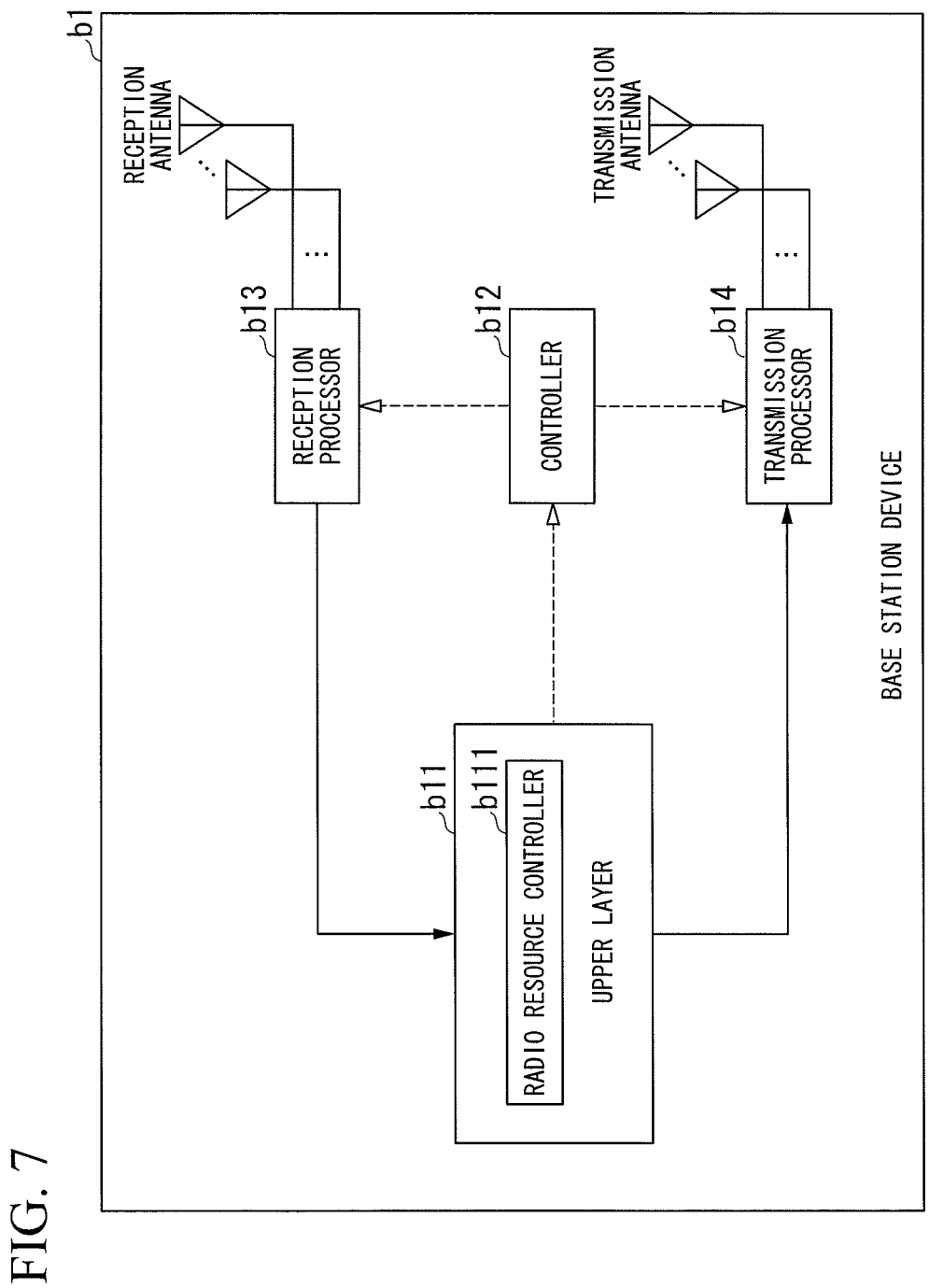
FIG. 7 is a schematic block diagram illustrating a configuration of a base station device according to the first embodiment.

FIG. 7 is a schematic block diagram illustrating a configuration of the base station device b1 according to the first embodiment. As shown in FIG. 7, the base station device b1 includes an upper layer processor b11, a controller b12, a reception processor b13, multiple reception antennas, a transmission processor b14, and multiple transmission antennas. The upper layer processor b11 includes a radio resource controller b111. Although the reception antenna is configured to be separated from the transmission antenna in the case of FIG. 7, these antennas may be shared by using a thyristor that switches an input and an output of a signal.

The upper layer processor b11 outputs, to the transmission processor b14, data information for each uplink carrier component. The upper layer processor b11 processes a packet data convergence protocol layer, a radio link control layer, and a radio resource control layer. A radio resource controller of an upper layer manages various setting information for each mobile station device, a state of communication, and a state of buffer.

In the aforementioned process, the radio resource controller b111 included in the upper layer processor b11 selects multiple uplink carrier components, and assigns radio resources included in each of the selected uplink carrier components to the mobile station device a1 as radio resources to be allocated with uplink control information or data information. The radio resource controller b111 transmits, as downlink control information, uplink shared channel assignment information indicating the assignment to the mobile station device a1.

The radio resource controller b111 manages various setting information for each mobile station device, a state of communication, and a state of buffer. The radio resource controller b111 generates, or obtains from a network, information pieces to be allocated to respective channels of each uplink carrier component, and outputs the generated information pieces to the transmission processor a14 for each uplink carrier component. For example, the radio resource controller b111 generates ACK/NACK in response to data on a physical uplink shared channel according to the result of an HARQ process. Then, the radio resource controller b111 outputs the generated ACK/NACK to the transmission processor b14. Additionally, for example, the radio resource controller b111 generates downlink control information, and outputs the generated downlink control information to the transmission processor b14.

Additionally, the radio resource controller b111 generates control information for controlling the reception processor b13 and the transmission processor b14, based on the uplink control information (ACK/NACK, channel quality information, a scheduling request, and a state of a buffer of the mobile station device a1) notified through a physical uplink shared channel. Then, the radio resource controller b111 outputs the generated control information to the controller b12. For example, the radio resource controller a111 outputs, to the controller a12, for each mobile station device a1, shared channel assignment information indicating an uplink carrier component allocated with a physical uplink shared channel. Additionally, for example, when extracting signals on a physical uplink shared channel, the radio resource controller b111 reads out from a storing unit (not shown), demapping information that orders to perform demapping that is an inverse operation of the mapping shown in FIG. 4, and outputs the demapping information to the controller b12. The demapping information may be previously stored at the time of manufacturing the base station device b1, at the time of updating software, or at the time of updating by an operator's operation. Alternatively, the demapping information may be previously stored when the demapping information is notified by the mobile station device a1.

Based on the control information received from the upper layer processor b11, the controller b12 generates a control signal that controls the reception processor b13 and the transmission processor b14. The shared channel assignment information signal generated based on the shared channel assignment information indicates one or more of the upper carrier component numbers n (n=0, 1, 2) of the upper carrier components respectively allocated with physical uplink shared channels, or "9" which indicates that no physical uplink shared channel is allocated.

According to the control signal received from the controller b12, the reception processor b13 demodulates and decodes reception signals received from the mobile station device a1 through the reception antennas. The reception processor b13 outputs the decoded information to the upper layer processor b11. At the time of the demodulation process, the reception processor b13 extracts, according to a predetermined allocation rule, uplink control information from the reception signal received from the mobile station device a1 assigned with physical uplink shared channels, and demodulates and decodes the extracted uplink control information. The details of the reception processor b13 will be explained later.

The transmission processor b14 generates a downlink reference signal according to the control signal received from the controller b12. The transmission processor b14 encodes and modulates the data information and the downlink control information (for example, uplink shared channel assignment information, downlink shared channel assignment information indicating assignment of radio resources of a physical downlink shared channel included in each downlink carrier component) that are received from the upper layer processor b11, and thus generates modulation symbols.

The transmission processor b14 allocates the generated modulation symbols onto physical downlink shared channels and physical downlink control channels, multiplexes the allocated modulation symbols with the generated uplink reference signal, and then transmits the multiplexed signals to the mobile station device a1 through the transmission antennas.

(Configuration of Reception Processor b13)

Hereinafter, the reception processor b13 is explained in detail.

Figure 8:
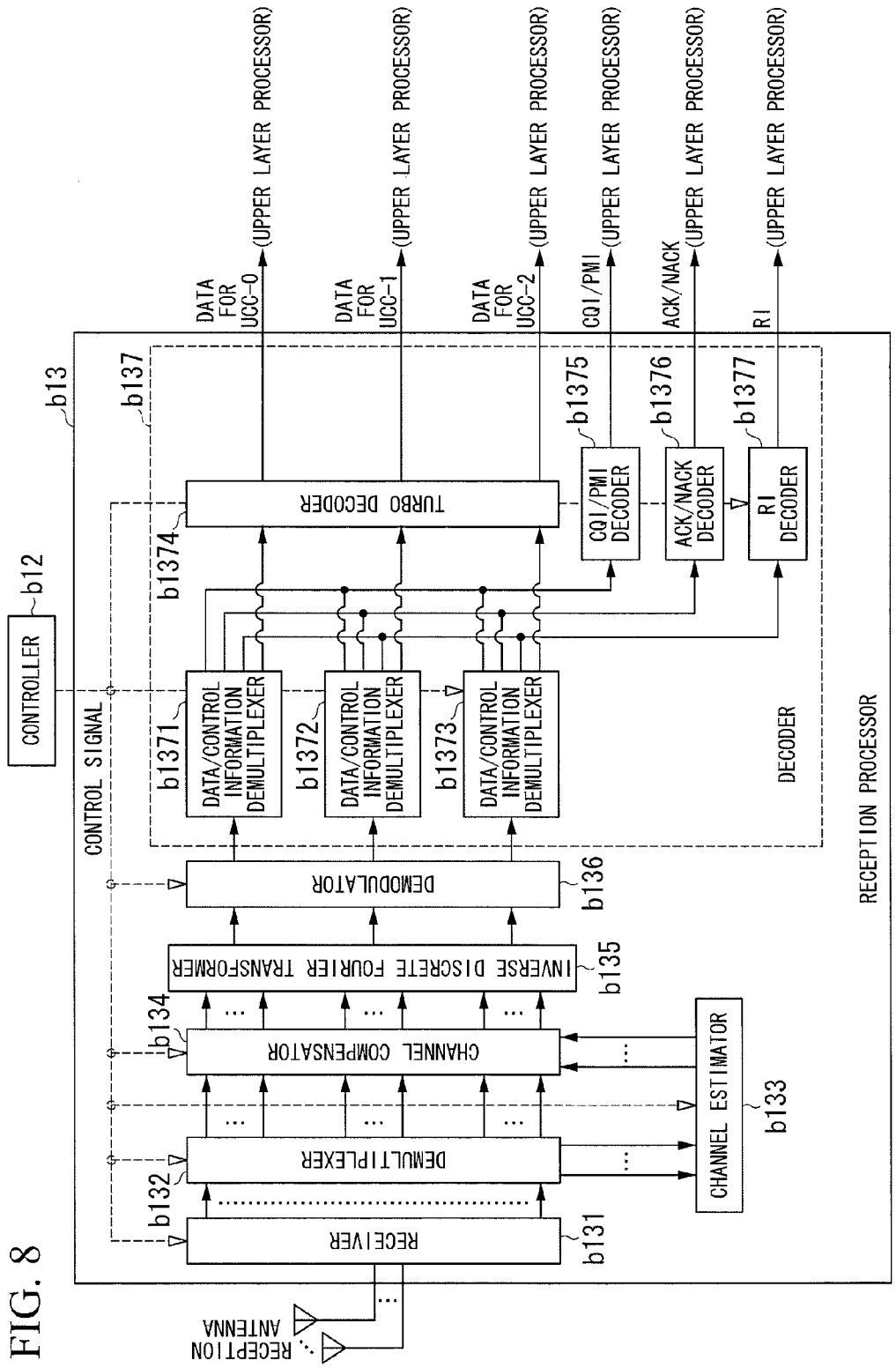
FIG. 8 is a schematic block diagram illustrating a configuration of a reception processor of a base station device according to the first embodiment.

FIG. 8 is a schematic block diagram illustrating a configuration of the reception processor b13 of the base station device b1 according to the first embodiment. As shown in FIG. 8, the reception processor b13 includes a receiver b131, a demultiplexer b132, a channel estimator b133, a channel compensator b134, an inverse Fourier transformer b135, a demodulator b136, and a decoder b137. The decoder b137 includes data/control information demultiplexers b1371 to b1373, a turbo decoder b1374, a CQI/PMI decoder b1375, an ACK/NACK decoder b1376, and an RI decoder b1377. FIG. 8 shows a case where the base station device b1 communicates with the mobile station device a1 using three uplink carrier components, as shown in FIG. 2. Each unit of the reception processor b13 operates according to a control signal received from the controller b12.

The receiver b131 converts (downconverts), into an intermediate frequency signal, a signal for each uplink carrier component which is received through each of the reception antennas. Then, the receiver b131 removes extra frequency components, and controls the amplification level so as to properly maintain the signal level. Then, the receiver b131 performs orthogonal demodulation, and converts the orthogonally-demodulated analog signal into a digital signal. The receiver b131 removes a portion of the guard interval from the converted digital signal. The receiver b131 performs fast Fourier transform on the signal from which the guard interval has been removed, to extract frequency-domain signals. The receiver b131 outputs the extracted signals for each uplink carrier component to the demultiplexer b132.

The demultiplexer b132 demultiplexes, for each uplink carrier component, the signals received from the receiver b131 into signals allocated onto a physical uplink control channel, signals allocated onto a physical uplink shared channel, and signals allocated onto a physical uplink pilot channel. The demultiplexing is performed based on the radio resource assignment information that the base station device b1 previously determines and communicates to the each mobile station device a1.

The demultiplexer b132 outputs the signals on the physical uplink control channel and the signals on the physical uplink shared channel to the channel compensator b134. Additionally, the demultiplexer b132 outputs the demultiplexed signals allocated onto the uplink pilot channel (uplink reference signal) to the channel estimator b133.

The channel estimator b133 calculates channel estimation values for physical uplink shared channels from streams of the uplink reference signal of each carrier component which are received from the demultiplexer b132. Then, the channel estimator b133 outputs the channel estimation values to the channel compensator b134.

The channel compensator b134 performs channel compensation on signals on the physical uplink control channel and the physical uplink shared channel of each carrier component which are received from the demultiplexer b132. The channel compensator b134 outputs, to the inverse Fourier transformer b135, the signals subjected to the channel compensation.

The inverse Fourier transformer b135 arranges the signals of each upper carrier component which are received from the channel compensator b134 onto predetermined frequencies used by the discrete Fourier transformer a143 of the mobile station device a1 for performing discrete Fourier transform. The inverse Fourier transformer b135 performs inverse Fourier transform on the arranged signals, and outputs signals on a physical uplink shared channel to the demodulator b136.

The demodulator b136 demodulates the signals for each upper carrier component which are received from the inverse Fourier transformer b135 by using one of modulation schemes, such as QPSK, 16QAM, and 64QAM, which the base station device b1 has previously determined and communicated to each mobile station device a1. The demodulator b136 arranges in series the demodulated encoded bits for each of the upper carrier components, and outputs the arranged encoded bits to the data/control information demultiplexers b1371 to b1373 associated with the respective upper carrier components.

The data/control information demultiplexers b1371 to b1373 are associated with the upper carrier components allocated with the upper carrier component numbers 0 to 2, respectively. The data/control information demultiplexers b1371 to b1373 perform a control information demultiplexing process to demultiplex the encoded bits of the signals arranged in the associated upper carrier components. The data/control information demultiplexers b1371 to b1373 have the same function, and therefore only the data/control information demultiplexer b1373 is explained hereinafter.

Hereinafter, the control information demultiplexing process performed by the data/control information demultiplexer b1373 is explained.

When the shared channel assignment information signal indicates "9," that is when it is determined that no physical uplink shared channel is assigned to the mobile station device a1 having transmitted the received information, the data/control information demultiplexer b1373 extracts encoded bits (CQI/PMI encoded bits, ACK/NACK encoded bits, and RI encoded bits) of uplink control information from encoded bits on the physical uplink control channel. In this case, the data/control information demultiplexer b1373 does not extract encoded bits on the physical uplink shared channel.

On the other hand, when the shared channel assignment information signal indicates "2" that is one of the uplink carrier component numbers, the data/control information demultiplexer b1373 demultiplexes encoded bits on the physical uplink shared channels according to the allocation shown in FIG. 4A. This case is a case where the base station device b1 assigns only one physical uplink shared channel allocated with the uplink carrier component number "2" to the mobile station device a1 having transmitted the information input to the data/control information demultiplexer b1373. The data/control information demultiplexer b1371 performs the above process of demultiplexing encoded bits when the shared channel assignment information signal indicates "0" that is one of the uplink carrier component numbers. The data/control information demultiplexer b1372 performs the above process of demultiplexing encoded bits when the shared channel assignment information signal indicates "1" that is one of the uplink carrier component numbers.

When the shared channel assignment information signal indicates two or more of the uplink carrier component numbers n (n=0, 1, 2), the data/control information demultiplexer b1373 performs a process of demultiplexing encoded bits according to the same predetermined allocation rule as used by the mobile station device a1 in the following manner. This case is a case where the base station device b1 assigns multiple physical uplink shared channels of the respective uplink carrier components allocated with the respective uplink carrier component numbers, to the mobile station device a1 having transmitted the information input to the data/control information demultiplexer b1373.

Firstly, the data/control information demultiplexer b1373 selects the largest uplink carrier component number among the uplink carrier component numbers n indicated by the shared channel assignment information signal. The data/control information demultiplexer b1373 determines whether or not the selected uplink carrier component number n is "2." When the selected uplink carrier component number n is determined to be "2," the data/control information demultiplexer b1373 demultiplexes encoded bits on the physical uplink shared channel according to the allocation shown in FIG. 4A. In other words, the data/control information demultiplexer b1373 selects, according to a predetermined rule, an uplink carrier component among multiple upper carrier components allocated with radio resources, and then extracts uplink control information allocated to radio resources in the selected uplink carrier component. The data/control information demultiplexer b1372 demultiplexes encoded bits on the physical uplink shared channel according to the allocation shown in FIG. 4A when the selected uplink carrier component number n is "1."

The data/control information demultiplexer b1373 outputs data encoded bits, CQI/PMI encoded bits, ACK/NACK encoded bits, and RI encoded bits, which are demultiplexed by the above control information demultiplexing process, to the turbo decoder b1374, the CQI/PMI decoder b1375, the ACK/NACK decoder b1376, and the RI decoder b1377, respectively.

The turbo decoder b1374 performs error correction decoding by a turbo decoding method on data encoded bits for each uplink carrier component, which are received from the data/control information demultiplexers b1371 to b1373. Then, the turbo decoder b1374 outputs the decoded data to the upper layer processor b11. The turbo decoder b1374 performs error correction decoding on data encoded bits replaced with ACK/NACK and RI encoded bits, assuming that a possibility of a bit value of 0 is equal to a possibility of a bit value of 1.

The CQI/PMI decoder b1375 performs error correction decoding on CQI/PMI encoded bits received from the data/control information demultiplexers b1371 to b1373, and outputs the decoded data to the upper layer processor b11.

The ACK/NACK decoder b1376 performs error correction decoding on ACK/NACK encoded bits received from the data/control information demultiplexers b1371 to b1373, and outputs the decoded data to the upper layer processor b11.

The RI decoder b1377 performs error correction decoding on RI encoded bits received from the data/control information demultiplexers b1371 to b1373, and outputs the decoded data to the upper layer processor b11.

The CQI/PMI decoder a1374, the ACK/NACK decoder a1376, and the RI decoder a1377 switches error correction coding between when the shared channel assignment information signal indicates "9," that is when it is determined that no physical uplink shared channel is assigned to the mobile station device a1, and when the shared channel assignment information signal indicates one or more of the uplink carrier component numbers n (n=0, 1, 2), that is when one or more physical uplink shared channels are assigned to the mobile station device a1. In other words, the CQI/PMI decoder a1374, the ACK/NACK decoder a1376, and the RI decoder a1377 perform different error correction decoding based on whether the encoded bits are transmitted on a physical uplink control channel or a physical uplink shared channel.

(Operations of Wireless Communication System)

Hereinafter, operations of the wireless communication system are explained.

Figure 9:
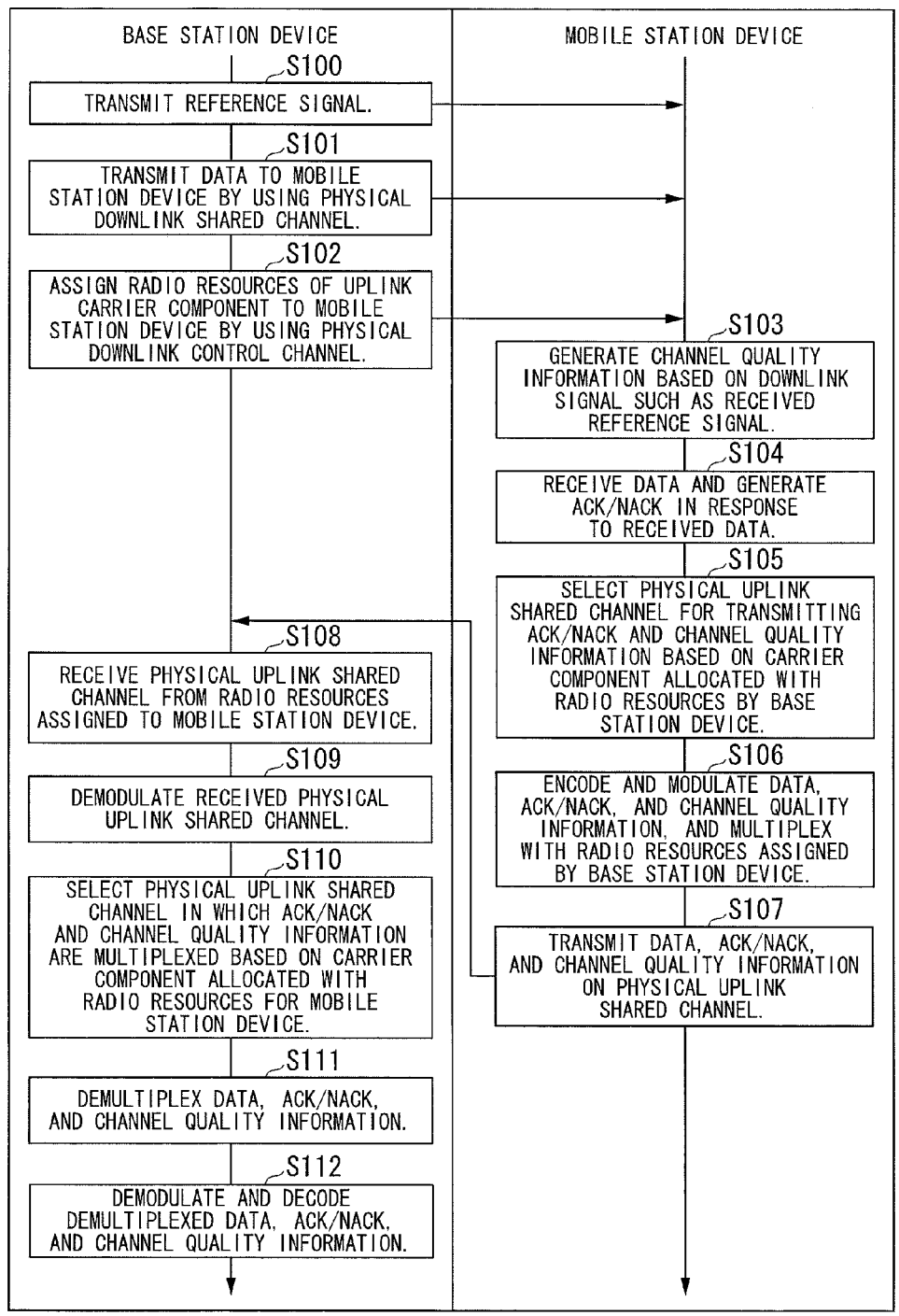
FIG. 9 is a flowchart illustrating an example of operations of a wireless communication system according to the first embodiment.

FIG. 9 is a flowchart illustrating an example of operations performed by the wireless communication system according to the first embodiment.

(Step S100) The base station device b1 spreads a downlink reference signal over all frequency bands of all downlink carrier components that the base station device b1 uses for communication, and transmits the downlink reference signal that is known to the mobile station device a1. Then, the routine proceeds to step S101.

(Step S101) The base station device b1 transmits, to the mobile station device a1, data information using a physical downlink shared channel. Then, the routine proceeds to step S102.

(Step S102) The base station device b1 assigns a physical uplink shared channel of an uplink carrier component to the mobile station device a1, and generates uplink shared channel assignment information indicating the assignment. The base station device b1 transmits the generated uplink shared channel assignment information using a physical downlink control channel. Then, the routine proceeds to step S103.

(Step S103) The mobile station device a1 receives the downlink reference signal transmitted in step S100, and generates channel quality information based on the received downlink reference signal. Then, the routine proceeds to step S104.

(Step S104) The mobile station device a1 receives data on the physical downlink shared channel transmitted in step S101 by the base station device b1, and generates ACK/NACK in response to the received data information. Then, the routine proceeds to step S105.

(Step S105) The mobile station device a1 receives the uplink shared channel assignment information transmitted in step S102, and selects a physical uplink shared channel for transmitting the ACK/NACK and the channel quality information, based on the received uplink shared channel assignment information. In the first embodiment, the mobile station device a1 selects a physical uplink shared channel of the uplink carrier component, which has the highest frequency among the physical uplink shared channels allocated in the aforementioned manner. Then, the routine proceeds to step S106.

(Step S106) The mobile station device a1 encodes and modulates the data information, the ACK/NACK, and the channel quality information, multiplexes the resultant items with radio resources of the uplink carrier component assigned by the base station device. Then, the routine proceeds to step S107.

(Step S107) When the physical uplink shared channel is assigned to the mobile station device a1, the mobile station device a1 transmits the data information, the ACK/NACK, and the channel quality information by using the physical uplink shared channel. Then, the routine proceeds to step S108.

(Step S108) The base station device b1 receives signals allocated onto the physical uplink shared channel of the uplink carrier component assigned to the mobile station device a1 in step S102. Then, the routine proceeds to step S109.

(Step S109) The base station device b1 demodulates the physical uplink shared channel received in step S108. Then, the routine proceeds to step S110.

(Step S110) The base station device b1 selects a physical uplink shared channel of the uplink carrier component allocated with the ACK/NACK and the channel quality information, based on the uplink shared channel assignment information generated in step S102. In the first embodiment, the base station device b1 selects a physical uplink shared channel of the uplink carrier component which has the highest frequency among the assigned physical uplink shared channels, as explained above. Then, the routine proceeds to step S111.

(Step S111) The base station device b1 demultiplexes the data information, the ACK/NACK, and the channel quality information from the physical uplink shared channel of the uplink carrier component selected in step S110. Then, the routine proceeds to step S112.

(Step S112) The base station device b1 demodulates and decodes the data information, the ACK/NACK, and the channel quality information which are demultiplexed in step S111. After step S112, the base station device b1 and the mobile station device a1 terminate transmission processes for the physical uplink shared channel.

(Structure of Physical Uplink Shared Channel)

Figure 10:
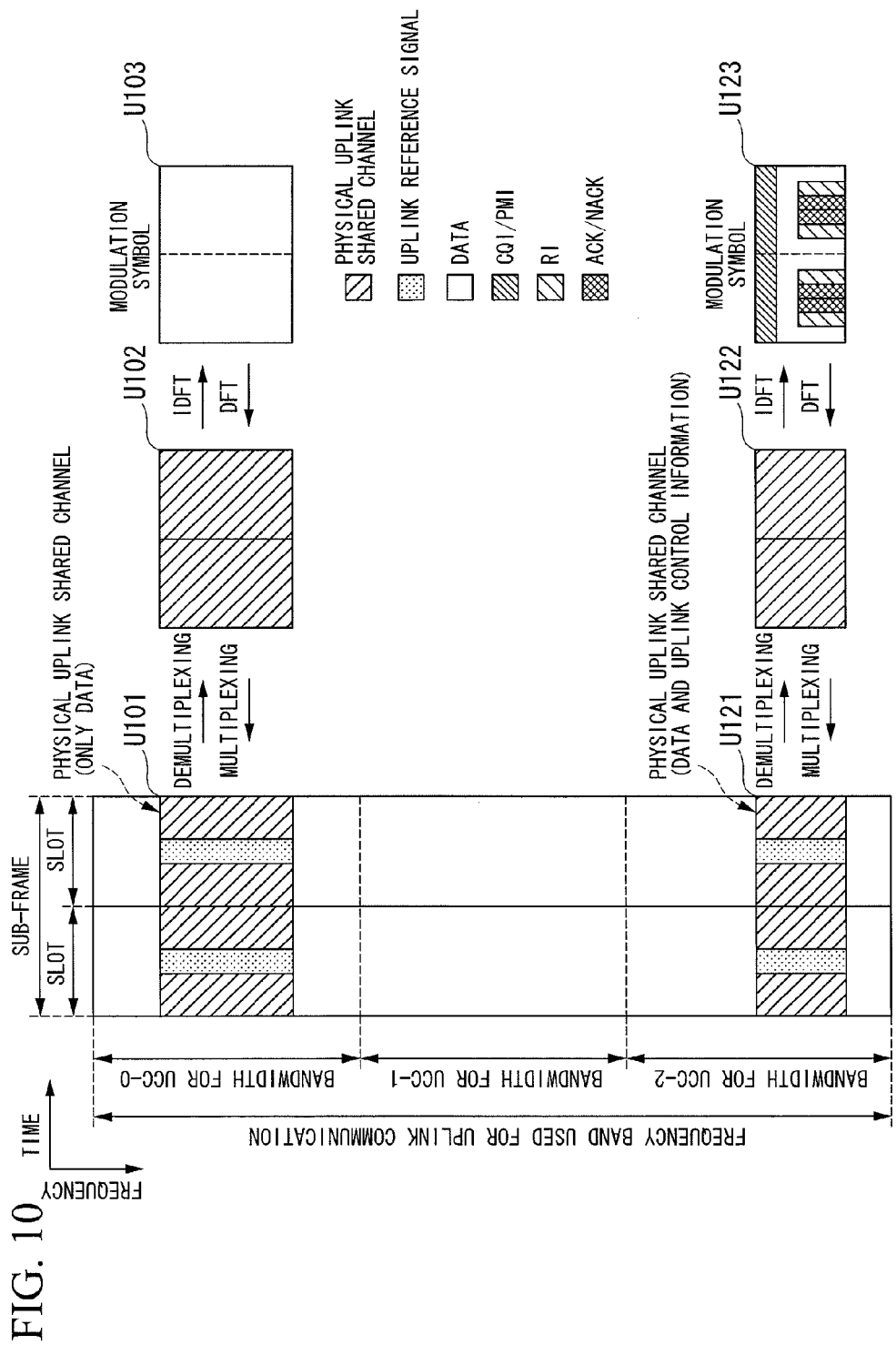
FIG. 10 illustrates an example of a configuration of physical uplink shared channels according to the first embodiment.

FIG. 10 illustrates an example of a structure of physical uplink shared channels according to the first embodiment. In FIG. 10, a horizontal axis denotes a time domain, and a vertical axis denotes a frequency domain. FIG. 10 illustrates a structure of physical uplink shared channels in one subframe. FIG. 10 illustrates a case where the base station device b1 allocates, for the mobile station device a1, physical uplink shared channels to UCC-0 and UCC-2 when performing communication using the carrier aggregation shown in FIG. 2.

In FIG. 10, UCC-0 and UCC-2 are allocated with symbols U101 (allocated with a reference numeral U101) on a physical uplink shared channel and symbols U121 (allocated with a reference numeral U121) on a physical uplink shared channel, respectively.

Regarding the symbols U101 and U121, the region hatched with diagonal lines falling from top left to bottom right denotes a symbol allocated onto a physical uplink shared channel. The region hatched with dots denotes an uplink reference signal. The symbols U101 and U121 are the symbols shown in FIG. 4B.

Symbols U102 allocated with a reference numeral U102 and symbols U122 allocated with a reference numeral U122 denote symbols generated by removing the uplink reference signals from the symbols U101 and U121, respectively.

Symbols U103 allocated with a reference numeral U103 and symbols U123 allocated with a reference numeral U123 denote symbols generated by performing inverse Fourier transform on the symbols U102 and U122, respectively.

In the symbols U103, a non-hatched region denotes a modulation symbol for data information. In the symbols U123, a region hatched with diagonal lines crossing in a grid manner denotes a modulation symbol for ACK/NACK. In the symbols U123, a region hatched with diagonal lines rising from bottom left to top right denotes a modulation symbol for RI. In the symbol U123, the region hatched with diagonal lines rising from bottom left to top right denotes a modulation symbol for CQI or PMI. In the symbol U123, a non-hatched region denotes a modulation symbol for data information.

FIG. 10 shows that uplink control information pieces (CQI/PMI, RI, ACK/NACK) are allocated to the physical uplink shared channels of the uplink carrier component UCC-2 having the highest frequency, when physical uplink shared channels are allocated to UCC-0 and UCC-2.

As explained above, according to the first embodiment, in the wireless communication system, the base station device b1 assigns radio resources in multiple uplink carrier components. The mobile station device a1 allocates uplink control information to radio resources in an uplink carrier component selected according to a predetermined rule, and performs transmission. The base station device b1 extracts the uplink control information allocated to the radio resources in the uplink carrier component selected according to the predetermined rule. Accordingly, the wireless communication system assigns radio resources in multiple carrier components, and thus can reliably communicate uplink control information and data information allocated to the assigned radio resources.

Additionally, in the first embodiment, the wireless communication system selects one uplink carrier component according to the rule predetermined by the mobile station device a1 and the base station device b1. Accordingly, the wireless communication system can perform multiplexing or demultiplexing on signals only in one selected uplink carrier component, and does not perform multiplexing or demultiplexing signals in other uplink carrier components to extract data information. Accordingly, processing load can be reduced compared to the case where uplink control information pieces are allocated to physical uplink shared channels in multiple uplink carrier components.

Further, in the wireless communication system of the first embodiment, the base station device b1 allocates uplink control information to physical uplink shared channels, thereby suppressing transmission power compared to the case where uplink control information is transmitted on physical uplink control channels.

Second Embodiment

Hereinafter, a second embodiment of the present invention is explained in detail with reference to the accompanying drawings.

The case where the wireless communication system selects one of the uplink carrier components allocated with physical uplink shared channels has been explained in the first embodiment. In the second embodiment, a case where a wireless communication system selects two or more (M pieces) of uplink carrier components allocated with physical uplink shared channels, as an uplink carrier component to be allocated with signals including uplink control information, is explained.

Comparing the wireless communication system of the second embodiment to the wireless communication system of the first embodiment, a transmission processor of a mobile station device and a reception processor of a base station device differ. However, the configurations and functions of other constituent elements do not differ from those of the first embodiment. Therefore, explanations of the same functions as of the first embodiment are omitted here. Hereinafter, a mobile station device according to the second embodiment is referred to as a mobile station device a2, and a base station device according to the second embodiment is referred to as a base station device b2.

(Configuration of Transmission Processor a24)

Figure 11:
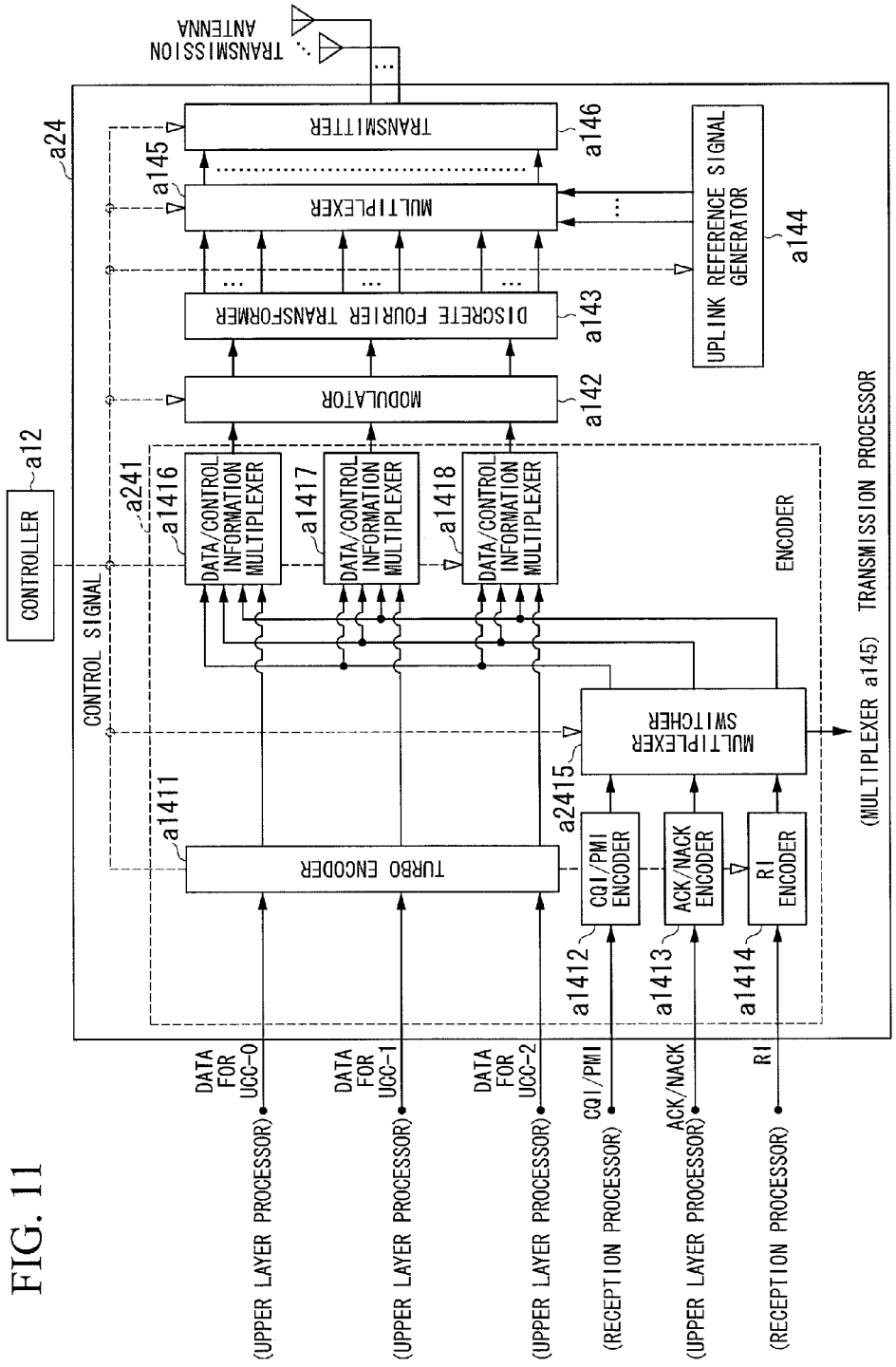
FIG. 11 is a schematic block diagram illustrating a configuration of a transmission processor of a mobile station device according to a second embodiment of the present invention.

FIG. 11 is a schematic block diagram illustrating a configuration of a transmission processor a24 of the mobile station device a2 according to the second embodiment of the present invention. Comparing the transmission processor a24 according to the second embodiment (shown in FIG. 11) to the transmission processor a14 according to the first embodiment (shown in FIG. 6), a multiplexer switcher a2415 differs. However, functions of other constituent elements (the turbo encoder a1411, the CQI/PMI encoder a1412, the ACK/NACK encoder a1413, the RI encoder a1414, the data/control information multiplexers a1416 to a1418, the modulator a142, the discrete Fourier transformer a143, the multiplexer a145, the uplink reference signal generator a144, and the transmitter a145) are the same as of the first embodiment. Therefore, explanations of the same functions as of the first embodiment are omitted here.

Hereinafter, a control information allocation switching process performed by the multiplexer switcher a2415 is explained.

When the shared channel assignment information signal indicates "9," the multiplexer switcher a2415 determines to output the encoded bits to the multiplexer a145.

On the other hand, when the shared channel assignment information signal indicates one of the uplink carrier component numbers n (n=0, 1, 2), the multiplexer switcher a2415 determines to output the encoded bits to one of the data/control information multiplexers a1416 to a1418 which is associated with the uplink carrier component allocated with the physical uplink shared channel.

Additionally, when the shared channel assignment information signal indicates two or more of the uplink carrier component numbers n (n=0, 1, 2), the multiplexer switcher a2415 determines where to output the encoded bit according to a predetermined allocation rule as follows.

In the second embodiment, firstly, the multiplexer switcher a2415 sequentially selects a predetermined number (M pieces) of uplink carrier component numbers n in descending order of the uplink carrier component number n starting from the largest uplink carrier component number n. The multiplexer switcher a2415 determines to output the encoded bits to the data/control information multiplexers a1416 to a1418 associated with the uplink carrier components allocated with the selected M pieces of uplink carrier component numbers n. In other words, the multiplexer switcher a2415 determines to output the encoded bits to the data/control information multiplexers a1416 to a1418 associated with the M uplink carrier components arranged in descending order of frequency from the uplink carrier component having the highest frequency. In other words, the multiplexer switcher a2415 selects two or more uplink carrier components.

The multiplexer switcher a2415 outputs the encoded bits to the outputs determined by the above control information allocation switching process.

(Configuration of Reception Processor b23)

Figure 12:
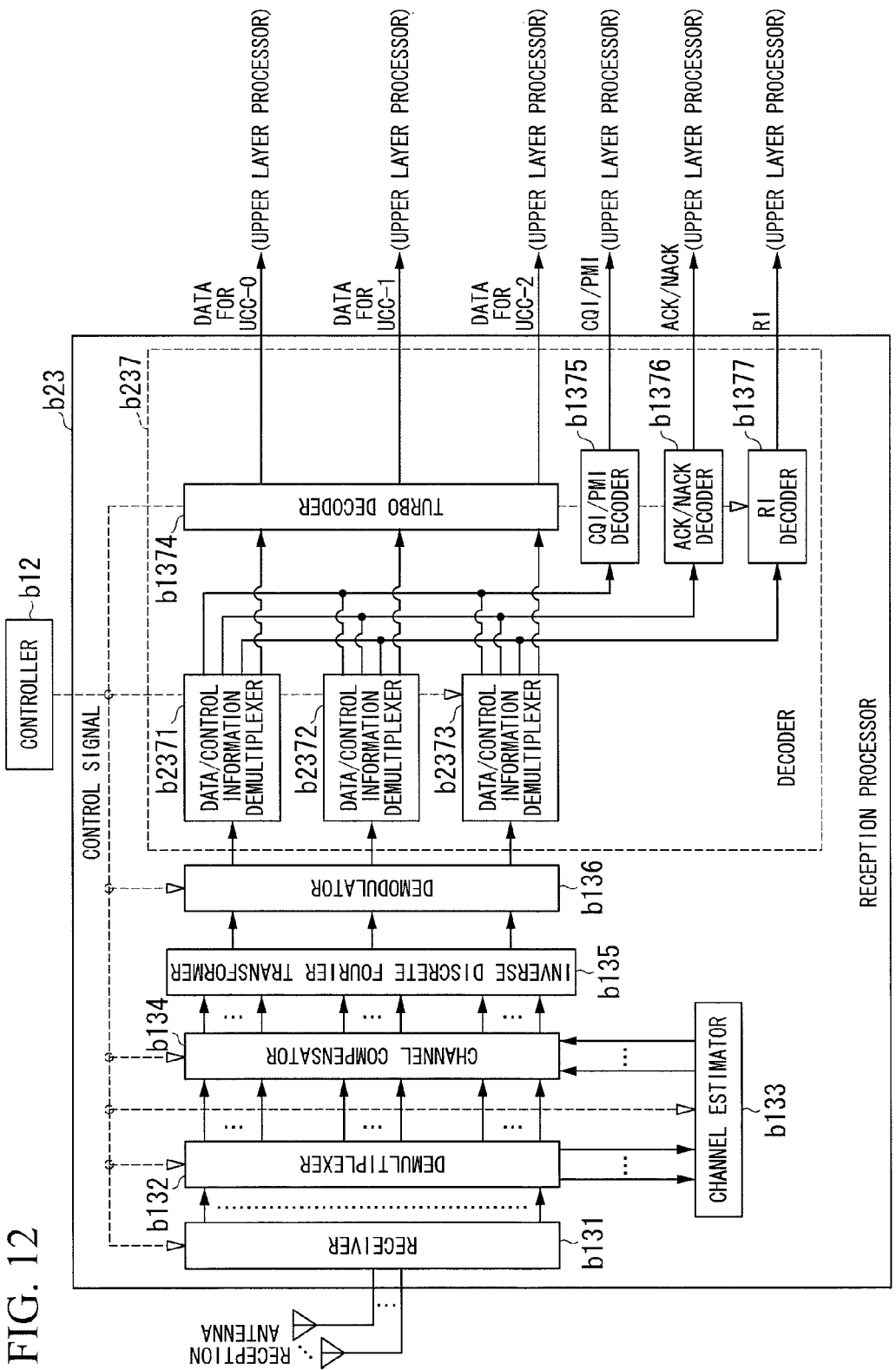
FIG. 12 is a schematic block diagram illustrating a configuration of a reception processor of a base station device according to the second embodiment.

FIG. 12 is a configuration of a reception processor b23 of the base station device b2 according to the second embodiment. Comparing the reception processor b23 according to the second embodiment to the reception processor b13 according to the first embodiment, the data/control information demultiplexers b2371 to b2373 differ. However, functions of other constituent elements (the receiver b131, the demultiplexer b132, the channel estimator b133, the channel compensator b134, the inverse Fourier transformer b135, the demodulator b136, the turbo decoder b1374, the CQI/PMI decoder b1375, the ACK/NACK decoder b1376, and the RI decoder b1377) are the same as those of the first embodiment. Therefore, explanations of the same functions as of the first embodiment are omitted here.

The data/control information demultiplexers b2371 to b2373 are associated with uplink carrier components allocated with the uplink carrier component numbers 0 to 2, respectively. Each of the data/control information demultiplexers b2371 to b2373 performs a control information demultiplexing process to demultiplex encoded bits of signals allocated to associated one of the uplink carrier components. The data/control information demultiplexers b2371 to b2373 have the same functions, and therefore only one (the data/control information demultiplexer b2373) is explained.

Hereinafter, a control information demultiplexing process performed by the data/control information demultiplexer b2373 is explained.

When the shared channel assignment information signal indicates "9," the data/control information demultiplexer b2373 extracts encoded bits of the uplink control information from encoded bits on a physical uplink control channel.

On the other hand, when the shared channel assignment information signal indicates "2" that is one of the uplink carrier component numbers, the data/control information demultiplexer b2373 demultiplexes encoded bits on a physical uplink shared channel according to the allocation shown in FIG. 4A.

When the shared channel assignment information signal indicates two or more of the uplink carrier component numbers n (n=0, 1, 2), the data/control information demultiplexer b2373 performs a process of demultiplexing encoded bits according to the same predetermined allocation rule as used by the mobile station device a2 in the following manner.

Firstly, the data/control information demultiplexer b2373 sequentially selects, among the uplink carrier component numbers n indicated by the shared channel allocation information signal, a predetermined number (M pieces) of uplink carrier component numbers n in descending order of the uplink carrier component number n starting from the largest uplink carrier component number n. The data/control information demultiplexer b2373 determines whether or not the selected uplink carrier component number n is "2." When the selected uplink carrier component number n is determined to be "2," the data/control information demultiplexer b2373 demultiplexes the encoded bits on the physical uplink shared channel according to the allocation shown in FIG. 4A. In other words, the data/control information demultiplexer b2373 selects multiple carrier components. When the selected uplink carrier component number n is determined to be "0," the data/control information demultiplexer b2381 demultiplexes the encoded bits on the physical uplink shared channel according to the allocation shown in FIG. 4A. When the selected uplink carrier component number n is determined to be "1," the data/control information demultiplexer b2372 demultiplexes the encoded bits on the physical uplink shared channel according to the allocation shown in FIG. 4A.

The data/control information demultiplexer b2373 outputs the data encoded bits, the CQI/PMI encoded bits, the ACK/NACK encoded bits, and the RI encoded bits to the turbo decoder b1374, the CQI/PMI decoder b1375, the ACK/NACK decoder b1376, and the RI decoder b1377, respectively.

(Structure of Uplink Shared Channel)

Figure 13:
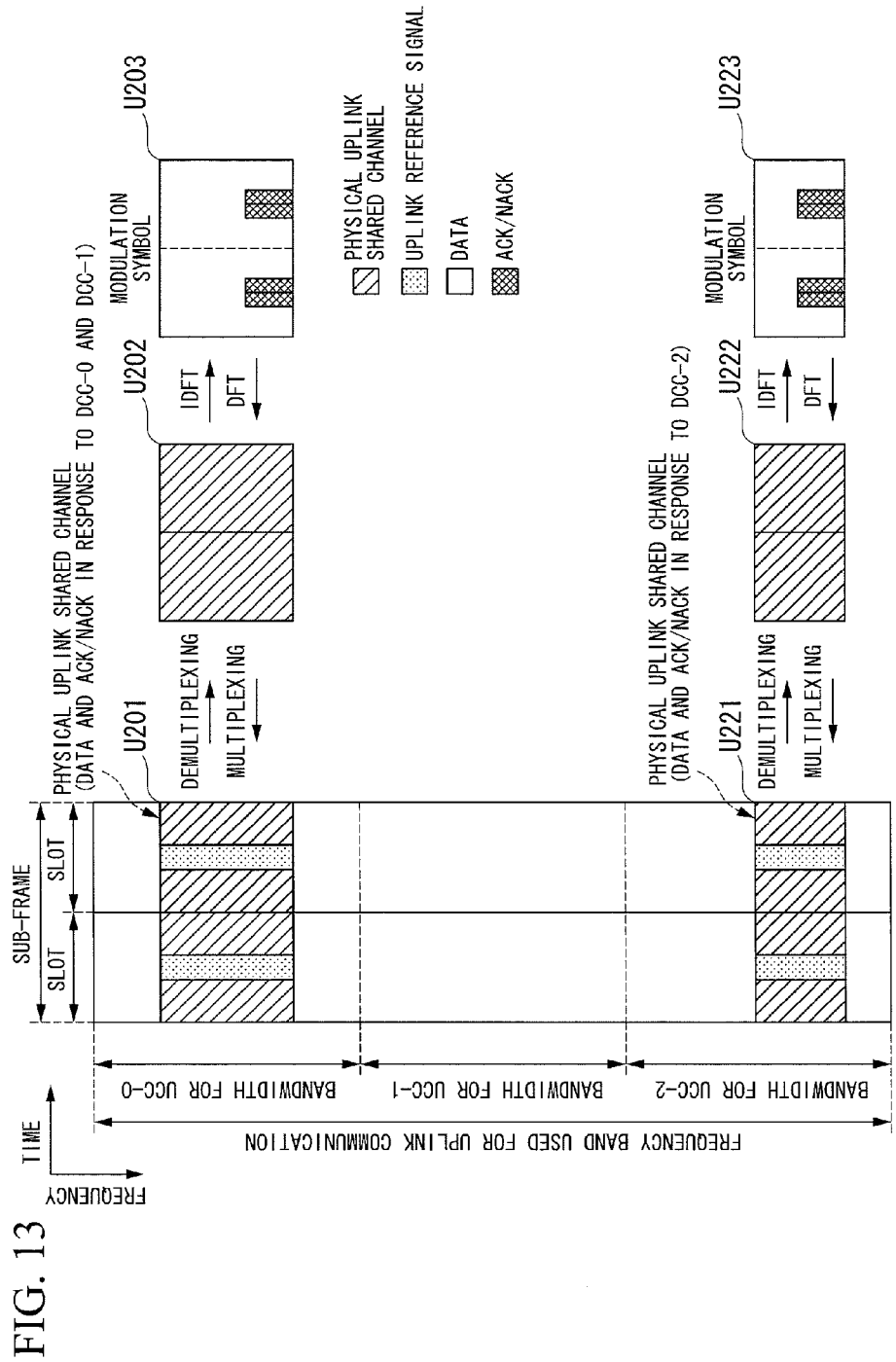
FIG. 13 illustrates an example of a structure of physical uplink shared channels according to the second embodiment.

FIG. 13 illustrates an example of a structure of physical uplink shared channels according to the second embodiment. In FIG. 13, a horizontal axis denotes a time domain, and a vertical axis denotes a frequency domain. FIG. 13 illustrates a structure of physical uplink shared channels in one subframe. FIG. 13 illustrates a case where the base station device b2 allocates, for the mobile station device a2, physical uplink shared channels to UCC-0 and UCC-2 when performing communication using the carrier aggregation shown in FIG. 2 and when the predetermined number M=2.

In this case, the multiplexer switcher a2415 of the mobile station device a2 and the data/control information demultiplexers b2371 to b2373 of the base station device b2 select the uplink carrier component numbers "0" and "2" indicated by the shared channel assignment information signal.

In FIG. 13, UCC-0 and UCC-2 are allocated with symbols U201 (allocated with a reference numeral U201) on a physical uplink shared channel and symbols U121 (allocated with a reference numeral U221) on a physical uplink shared channel, respectively.

Regarding the symbols U101 and U121, the region hatched with diagonal lines falling from top left to bottom right denotes a symbol allocated onto a physical uplink shared channel. The region hatched with dots denotes an uplink reference signal. The symbols U101 and U121 are the symbols shown in FIG. 4B.

Symbols U202 allocated with a reference numeral U202 and symbols U222 allocated with a reference numeral U222 denote symbols generated by removing the uplink reference signals from the symbols U201 and U221, respectively.

Symbols U203 allocated with a reference numeral U203 and symbols U223 allocated with a reference numeral U223 denote symbols generated by performing inverse Fourier transform on the symbols U202 and U222, respectively.

In the symbols U203 and U223, a region hatched with diagonal lines crossing in a grid manner denotes a modulation symbol for ACK/NACK. In the symbols U203 and U223, the region hatched with diagonal lines rising from bottom left to top right denotes a modulation symbol for CQI or PMI. In the symbols U203 and U223, a non-hatched region denotes a modulation symbol for data information.

In FIG. 13, the modulation symbols for ACK/NACK among the symbols U203 are modulation symbols for ACK/NACK in response to the physical downlink shared channels in DCC-0 and DCC-1. In FIG. 13, the modulation symbols for ACK/NACK among the symbols U223 are modulation symbols for ACK/NACK in response to the physical downlink shared channel in DCC-2. Thus, the types of ACK/NACK in response to the respective downlink carrier components, which are to be allocated to the respective uplink carrier components allocated with the respective physical uplink shared channels may be determined previously. Additionally, the ACK/NACK may be distributedly allocated to multiple uplink carrier components respectively allocated with physical uplink shared channels.

Figure 14:
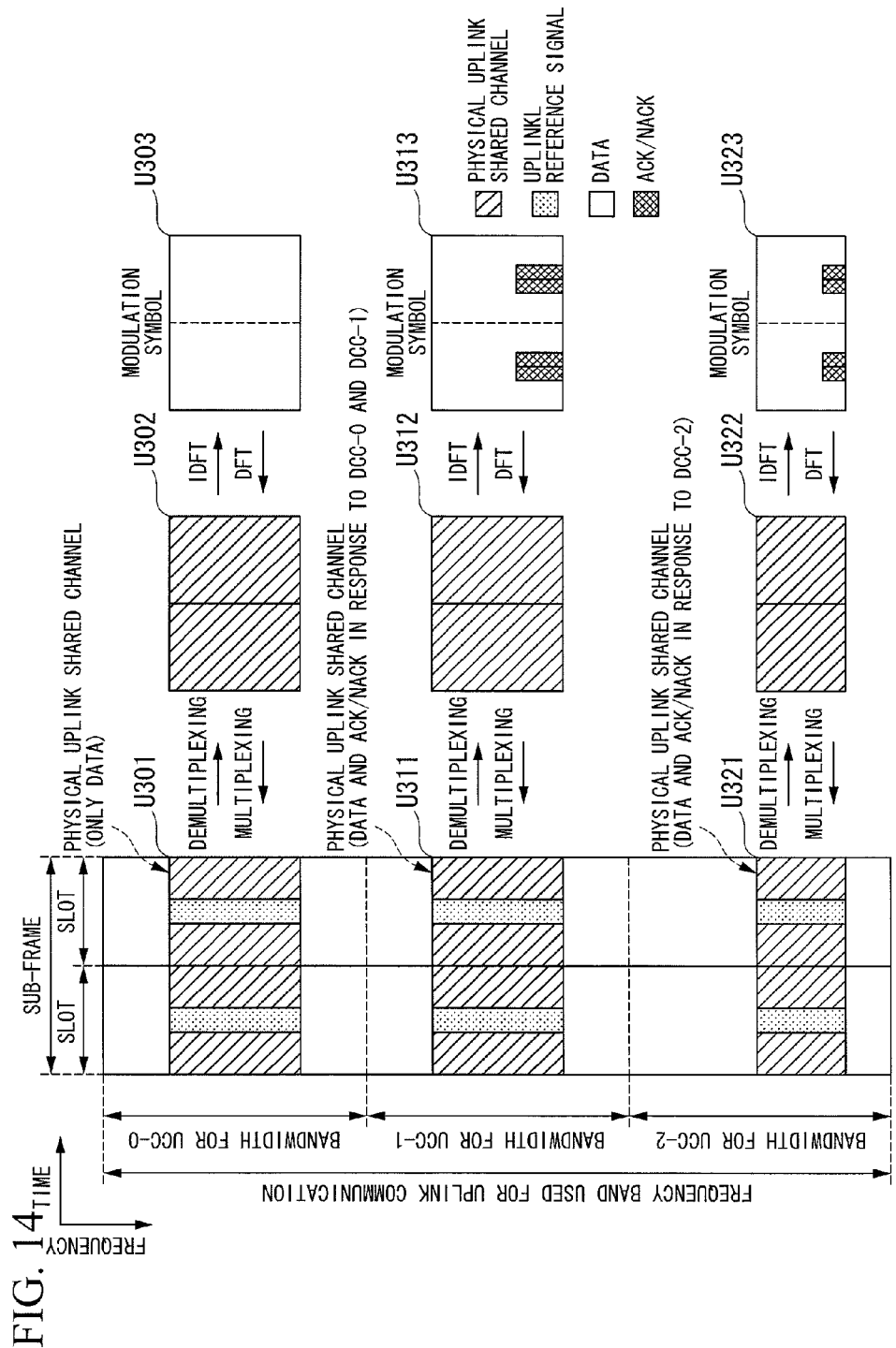
FIG. 14 illustrates another example of a structure of physical uplink shared channels according to the second embodiment.

FIG. 14 illustrates another example of a structure of physical uplink shared channels according to the second embodiment. In FIG. 14, a horizontal axis denotes a time domain, and a vertical axis denotes a frequency domain. FIG. 14 illustrates a structure of physical uplink shared channels in one subframe. FIG. 14 illustrates a case where the base station device b2 allocates, for the mobile station device a2, physical uplink shared channels to UCC-0, UCC-1, and UCC-2 when performing communication using the carrier aggregation shown in FIG. 2 and when the predetermined number M=2.

In this case, the multiplexer switcher a2415 of the mobile station device a2 and the data/control information demultiplexers b2371 to b2373 of the base station device b2 select, among the uplink carrier component numbers "0," "1," and "2" which are indicated by the shared channel assignment information signal, the uplink carrier component numbers "2" and "1" in descending order of number (frequency).

In FIG. 14, UCC-0, UCC-1, and UCC-2 are allocated with symbols U301 (allocated with a reference numeral U301) on a physical uplink shared channel, symbols U311 (allocated with a reference numeral U311) on a physical uplink shared channel, and symbols U321 (allocated with a reference numeral U321) on a physical uplink shared channel, respectively.

Regarding the symbols U301, U311, and U321, the region hatched with diagonal lines falling from top left to bottom right denotes a symbol allocated onto a physical uplink shared channel. The region hatched with dots denotes an uplink reference signal. The symbols U301, U311, and U321 are the symbols shown in FIG. 4B.

Symbols U302 allocated with a reference numeral U302, symbols U312 allocated with a reference numeral U312, and symbols U322 allocated with a reference numeral U322 denote symbols generated by removing the uplink reference signals from the symbols U301, U3111, and U221, respectively.

Symbols U303 allocated with a reference numeral U303, symbols U313 allocated with a reference numeral U313, and symbols U323 allocated with a reference numeral U323 denote symbols generated by performing inverse Fourier transform on the symbols U302, U312, and U322, respectively.

In the symbols U303, a non-hatched region denotes a modulation symbol for data information. In the symbols U313 and U323, a region hatched with diagonal lines crossing in a grid manner denotes a modulation symbol for ACK/

NACK. In the symbols U313 and U323, the region hatched with diagonal lines rising from bottom left to top right denotes a modulation symbol for CQI or PMI. In the symbols U313 and U323, a non-hatched region denotes a modulation symbol for data information.

In FIG. 14, the modulation symbols for ACK/NACK among the symbols U313 are modulation symbols for ACK/NACK in response to the physical downlink shared channels in DCC-0 and DCC-1. In FIG. 13, the modulation symbols for ACK/NACK among the symbols U323 are modulation symbols for ACK/NACK in response to the physical downlink shared channel in DCC-2.

Thus, according to the second embodiment, in the wireless communication system, the mobile station device a2 allocates uplink control information onto physical uplink shared channels of the respective uplink carrier components selected by the mobile station device a2, and performs transmission. Accordingly, the uplink control information is centralized in one physical uplink shared channel. Therefore, an encoding rate for the physical uplink shared channel increases, thereby preventing deterioration of characteristics.

Third Embodiment

Hereinafter, a third embodiment of the present invention is explained in detail with reference to the accompanying drawings.

The case where the wireless communication system selects one of the uplink carrier components allocated with physical uplink shared channels, which has the highest frequency, has been explained in the first embodiment. In the third embodiment, a case where a wireless communication system selects, among the uplink carrier components respectively allocated with physical uplink shared channels, an uplink carrier components allocated with a physical uplink shared channel having the largest amount of radio resources, is explained.

Comparing the wireless communication system of the third embodiment to the wireless communication system of the first embodiment, a transmission processor of a mobile station device and a reception processor of a base station device differ. However, the configurations and functions of other constituent elements are the same as of the first embodiment. Therefore, explanations of the same functions as of the first embodiment are omitted here. Hereinafter, a mobile station device according to the third embodiment is referred to as a mobile station device a3, and a base station device according to the third embodiment is referred to as a base station device b3.

(Configuration of Transmission Processor a24)

Figure 15:
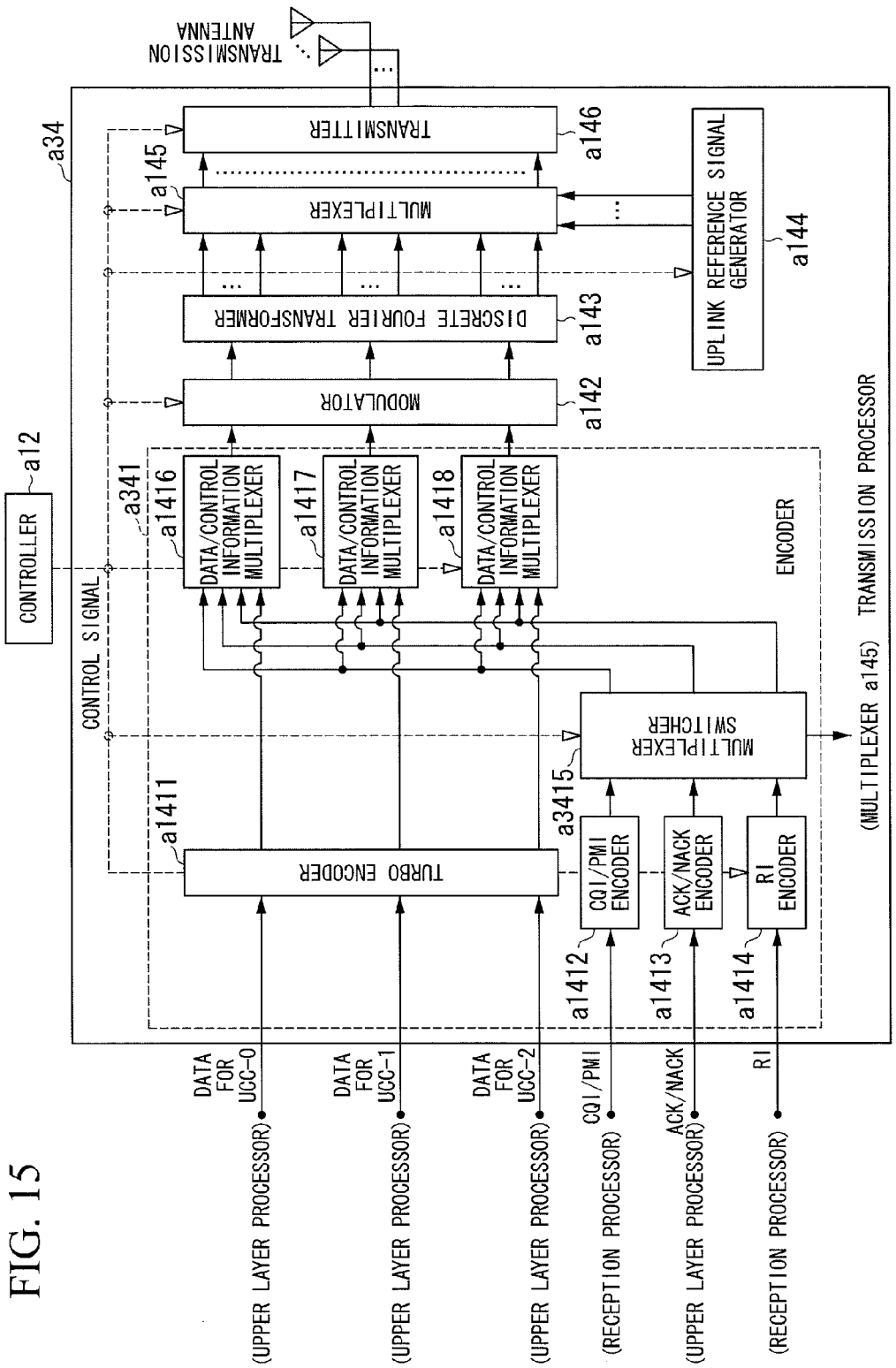
FIG. 15 is a schematic block diagram illustrating a configuration of a transmission processor of a mobile station device according to a third embodiment of the present invention.

FIG. 15 is a schematic block diagram illustrating a configuration of a transmission processor a34 of the mobile station device a3 according to the third embodiment of the present invention. Comparing the transmission processor a34 according to the third embodiment (shown in FIG. 15) to the transmission processor a14 according to the first embodiment (shown in FIG. 6), a multiplexer switcher a3415 differs. However, functions of other constituent elements (the turbo encoder a1411, the CQI/PMI encoder a1412, the ACK/NACK encoder a1413, the RI encoder a1414, the data/control information multiplexers a1416 to a1418, the modulator a142, the discrete Fourier transformer a143, the multiplexer a145, the uplink reference signal generator a144, and the transmitter a145) are the same of the first embodiment. Therefore, explanations of the same functions as of the first embodiment are omitted here.

Hereinafter, a control information allocation switching process performed by the multiplexer switcher a3415 is explained.

When the shared channel assignment information signal indicates "9," the multiplexer switcher a3415 determines to output the encoded bits to the multiplexer a145.

On the other hand, when the shared channel assignment information signal indicates one of the uplink carrier component numbers n (n=0, 1, 2), the multiplexer switcher a3415 determines to output the encoded bits to one of the data/control information multiplexers a1416 to a1418 which is associated with the uplink carrier component allocated with the physical uplink shared channel.

Additionally, when the shared channel assignment information signal indicates two or more of the uplink carrier component numbers n (n=0, 1, 2), that is when it is determined that the number of uplink carrier components allocated with physical uplink shared channels for the mobile station device a3 is two or more, the multiplexer switcher a3415 determines where to output the encoded bit according to a predetermined allocation rule as follows.

In the third embodiment, firstly, the multiplexer switcher a3415 selects, among the uplink carrier component numbers n indicated by the shared channel allocation information signal, the uplink carrier component number n of an uplink carrier component allocated with a physical uplink shared channel having the largest amount of radio resources. Specifically, the multiplexer switcher a3415 calculates the number of physical resource block pairs included in one physical uplink shared channel allocated to the associated one of the uplink carrier components. Then, the multiplexer switcher a3415 selects the uplink carrier component number n of an uplink carrier component corresponding to the largest number calculated. In other words, the multiplexer switcher a3415 selects, among the uplink carrier components allocated with radio resources, an uplink carrier component allocated with a physical uplink shared channel having the largest amount of radio resources. The multiplexer switcher a3415 determines to output the encoded bits to one of the data/control information multiplexers a1416 to a1418, which is allocated with the selected carrier component number n.

The multiplexer switcher a3415 outputs the encoded bits to the outputs determined by the above control information allocation switching process.

(Configuration of Reception Processor b33)

Figure 16:
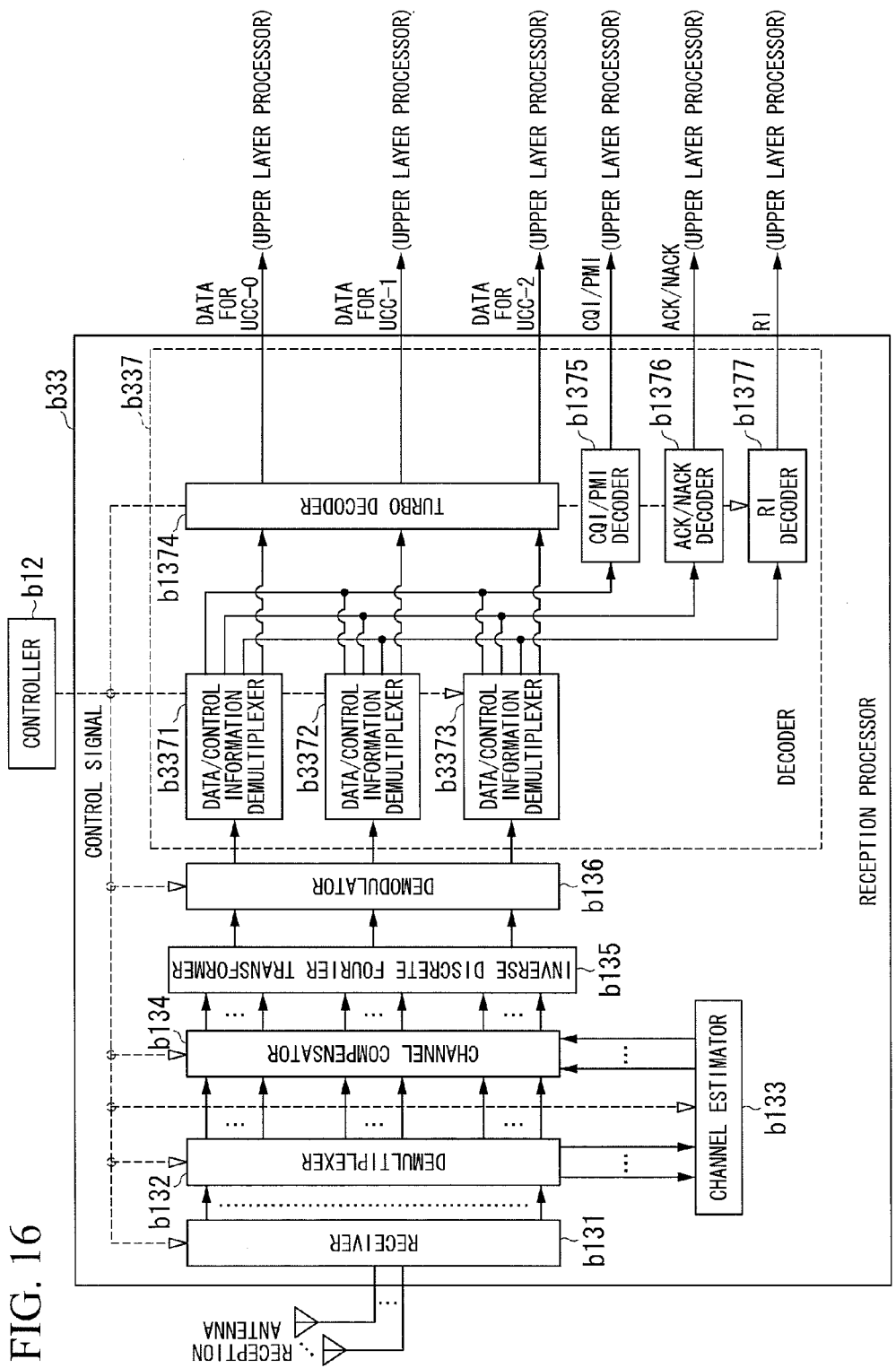
FIG. 16 is a schematic block diagram illustrating a configuration of a reception processor of a base station device according to the third embodiment.

FIG. 16 is a configuration of a reception processor b33 of the base station device b3 according to the third embodiment. Comparing the reception processor b33 according to the third embodiment (shown in FIG. 16) to the reception processor b13 according to the first embodiment (shown in FIG. 8), the data/control information demultiplexers b3371 to b3373 differ. However, functions of other constituent elements (the receiver b131, the demultiplexer b132, the channel estimator b133, the channel compensator b134, the inverse Fourier transformer b135, the demodulator b136, the turbo decoder b1374, the CQI/PMI decoder b1375, the ACK/NACK decoder b1376, and the RI decoder b1377) are the same as of the first embodiment. Therefore, explanations of the same functions as of the first embodiment are omitted here.

The data/control information demultiplexers b3371 to b3373 are associated with uplink carrier components allocated with the uplink carrier component numbers 0 to 2, respectively. Each of the data/control information demultiplexers b3371 to b3373 performs a control information demultiplexing process to demultiplex encoded bits of signals allocated to associated one of the uplink carrier components. The data/control information demultiplexers b3371 to b3373 have the same functions, and therefore only one (the data/control information demultiplexer b3373) is explained.

Hereinafter, a control information demultiplexing process performed by the data/control information demultiplexer b3373 is explained.

When the shared channel assignment information signal indicates "9," the data/control information demultiplexer b3373 extracts encoded bits of the uplink control information from encoded bits on a physical uplink control channel.

On the other hand, when the shared channel assignment information signal indicates "2" that is one of the uplink carrier component numbers, the data/control information demultiplexer b3373 demultiplexes encoded bits on a physical uplink shared channel according to the allocation shown in FIG. 4A.

When the shared channel assignment information signal indicates two or more of the uplink carrier component numbers n (n=0, 1, 2), the data/control information demultiplexer b3373 performs a process of demultiplexing encoded bits according to the same predetermined allocation rule as used by the mobile station device a3 in the following manner.

Firstly, the data/control information demultiplexer b3373 selects, among the uplink carrier component numbers n indicated by the shared channel assignment information signal, the uplink carrier component number n of an uplink carrier component allocated with a physical uplink shared channel having the largest amount of radio resources. The data/control information demultiplexer b3373 determines whether or not the selected uplink carrier component number n is "2." When the selected uplink carrier component number n is determined to be "2," the data/control information demultiplexer b3373 demultiplexes the encoded bits on the physical uplink shared channel according to the allocation shown in FIG. 4A. In other words, the data/control information demultiplexer b3373 selects, among multiple carrier components allocated with radio resources, an uplink carrier component allocated with a physical uplink shared channel having the largest amount of radio resources. When the selected uplink carrier component number n is determined to be "0," the data/control information demultiplexer b3381 demultiplexes the encoded bits on the physical uplink shared channel according to the allocation shown in FIG. 4A. When the selected uplink carrier component number n is determined to be "1," the data/control information demultiplexer b3372 demultiplexes the encoded bits on the physical uplink shared channel according to the allocation shown in FIG. 4A.

The data/control information demultiplexer b3373 outputs the data encoded bits, the CQI/PMI encoded bits, the ACK/NACK encoded bits, and the RI encoded bits to the turbo decoder b1374, the CQI/PMI decoder b1375, the ACK/NACK decoder b1376, and the RI decoder b1377, respectively.

(Structure of Uplink Shared Channel)

Figure 17:
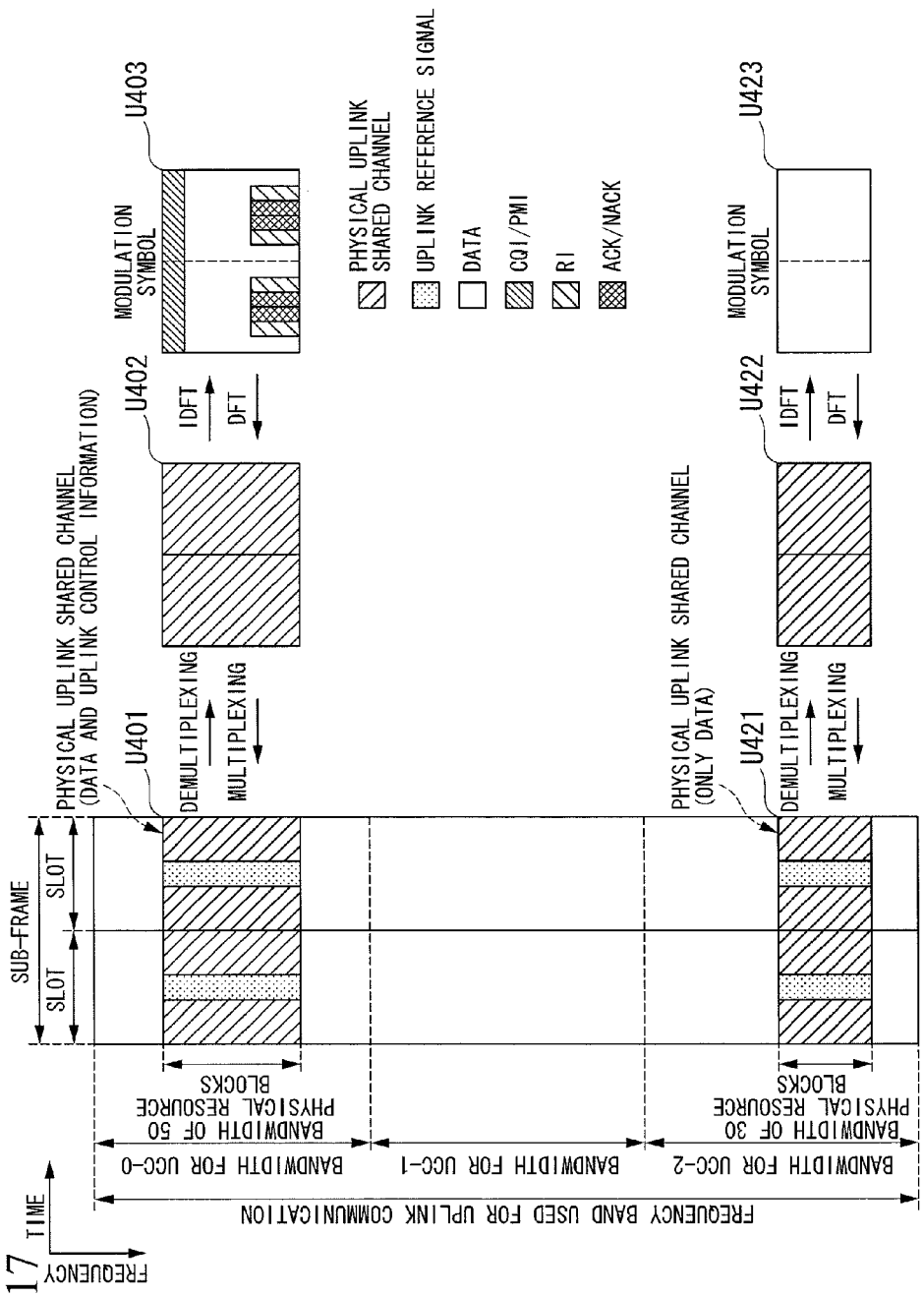
FIG. 17 illustrates an example of a structure of physical uplink shared channels according to the third embodiment.

FIG. 17 illustrates an example of a structure of physical uplink shared channels according to the third embodiment. In FIG. 17, a horizontal axis denotes a time domain, and a vertical axis denotes a frequency domain. FIG. 17 illustrates a structure of physical uplink shared channels in one subframe. FIG. 17 illustrates a case where the base station device b3 allocates, for the mobile station device a3, physical uplink shared channels to UCC-0 and UCC-2 when performing communication using the carrier aggregation shown in FIG. 2.

Additionally, FIG. 17 shows a case where the number of physical resource pairs allocated to the physical uplink shared channel allocated to UCC-0 (for example, 50 pieces) is larger than the number of physical resource pairs allocated to the physical uplink shared channel allocated to UCC-1 (for example, 30 pieces).

In this case, the multiplexer switcher a3415 of the mobile station device a3 and the data/control information demultiplexers b3371 to b3373 of the base station device b3 select the uplink carrier component numbers "0" indicated by the shared channel assignment information signal.

In FIG. 17, UCC-0 and UCC-2 are allocated with symbols U401 (allocated with a reference numeral U401) on a physical uplink shared channel and symbols U421 (allocated with a reference numeral U421) on a physical uplink shared channel, respectively.

Regarding the symbols U401 and U421, the region hatched with diagonal lines falling from top left to bottom right denotes a symbol allocated onto a physical uplink shared channel. The region hatched with dots denotes an uplink reference signal. The symbols U401 and U421 are the symbols shown in FIG. 4B.

Symbols U402 allocated with a reference numeral U402 and symbols U422 allocated with a reference numeral U422 denote symbols generated by removing the uplink reference signals from the symbols U401 and U421, respectively.

Symbols U403 allocated with a reference numeral U403 and symbols U423 allocated with a reference numeral U423 denote symbols generated by performing inverse Fourier transform on the symbols U402 and U422, respectively.

In the symbols U403, a region hatched with diagonal lines crossing in a grid manner denotes a modulation symbol for ACK/NACK. In the symbols U403, the region hatched with diagonal lines rising from bottom left to top right denotes a modulation symbol for CQI or PMI. In the symbols U403, a non-hatched region denotes a modulation symbol for data information.

In the symbols U423, a non-hatched region denotes a modulation symbol for data information.

Thus, according to the third embodiment, in the wireless communication system, the mobile station device a3 and the base station device b3 select an uplink carrier component including the largest amount of radio resources. Accordingly, the reception characteristics for uplink control information can be enhanced compared to the case where an uplink carrier component including a less mount of radio resource is selected.

Fourth Embodiment

Hereinafter, a fourth embodiment of the present invention is explained in detail with reference to the accompanying drawings.

The case where the wireless communication system selects one of the uplink carrier components allocated with physical uplink shared channels, which has the highest frequency, has been explained in the first embodiment. In the fourth embodiment, a case, where a wireless communication system selects one of uplink carrier components allocated with physical uplink shared channels based on a modulation scheme and an encoding rate for the physical uplink shared channels, is explained.

Comparing the wireless communication system of the fourth embodiment to the wireless communication system of the first embodiment, a transmission processor of a mobile station device and a reception processor of a base station device differ. However, the configurations and functions of other constituent elements do not differ from those of the first embodiment. Therefore, explanations of the same functions as of the first embodiment are omitted here. Hereinafter, a mobile station device according to the second embodiment is referred to as a mobile station device a4, and a base station device according to the second embodiment is referred to as a base station device b4.

(Configuration of Transmission Processor a44)

Figure 18:
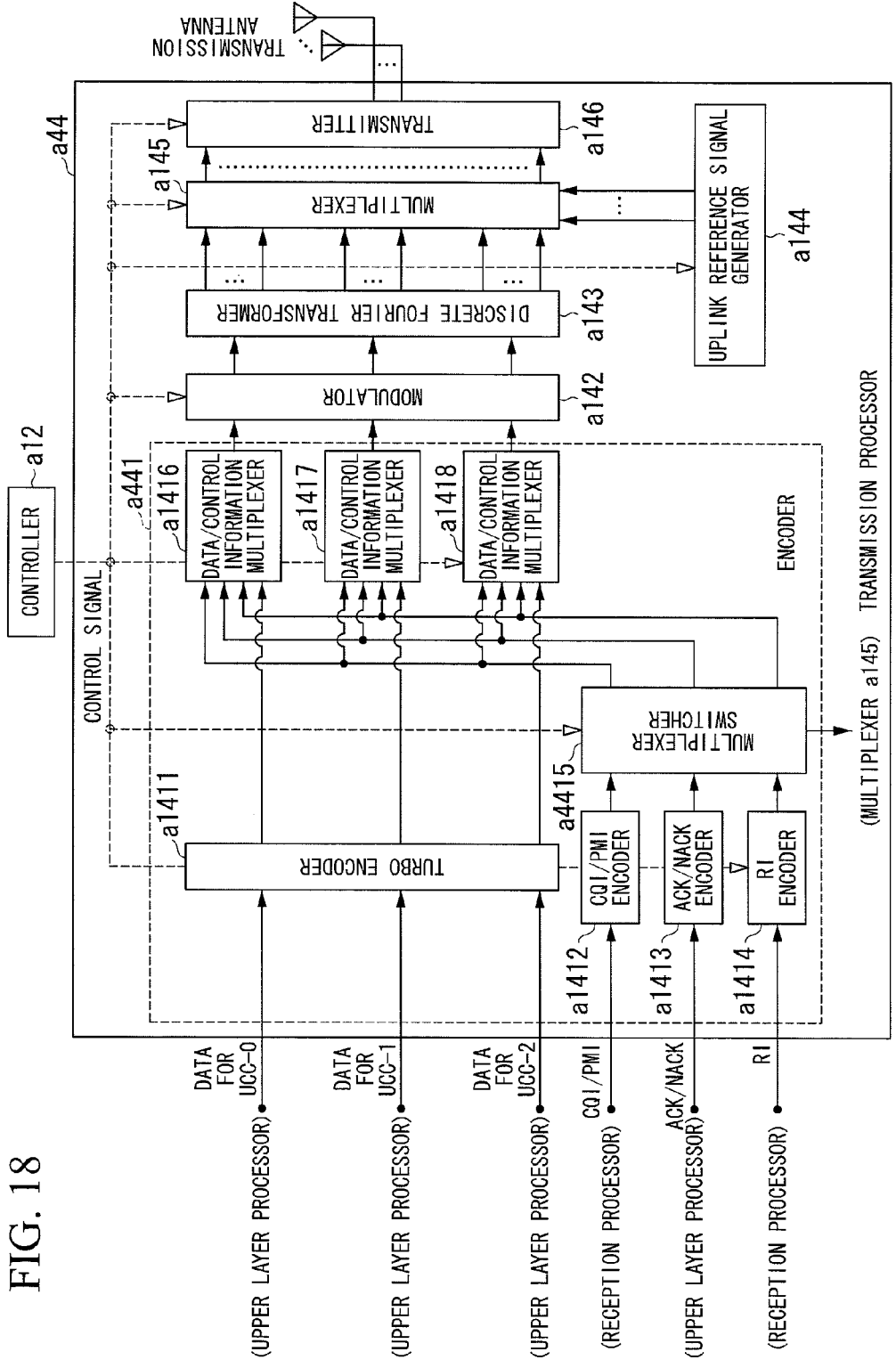
FIG. 18 is a schematic block diagram illustrating a configuration of a transmission processor of a mobile station device according to a fourth embodiment of the present invention.

FIG. 18 is a schematic block diagram illustrating a configuration of a transmission processor a44 of the mobile station device a4 according to the fourth embodiment of the present invention. Comparing the transmission processor a44 according to the fourth embodiment (shown in FIG. 18) to the transmission processor a14 according to the first embodiment (shown in FIG. 6), a multiplexer switcher a4415 differs. However, functions of other constituent elements (the turbo encoder a1411, the CQI/PMI encoder a1412, the ACK/NACK encoder a1413, the RI encoder a1414, the data/control information multiplexers a1416 to a1418, the modulator a142, the discrete Fourier transformer a143, the multiplexer a145, the uplink reference signal generator a144, and the transmitter a145) are the same as of the first embodiment. Therefore, explanations of the same functions as of the first embodiment are omitted here.

Hereinafter, a control information allocation switching process performed by the multiplexer switcher a4415 is explained.

When the shared channel assignment information signal indicates "9," the multiplexer switcher a4415 determines to output the encoded bits to the multiplexer a145.

On the other hand, when the shared channel assignment information signal indicates one of the uplink carrier component numbers n (n=0, 1, 2), the multiplexer switcher a2415 determines to output the encoded bits to one of the data/control information multiplexers a1416 to a1418 which is associated with the uplink carrier component allocated with the physical uplink shared channel.

Additionally, when the shared channel assignment information signal indicates two or more of the uplink carrier component numbers n (n=0, 1, 2), that is when it is determined that the number of uplink carrier components respectively allocated with physical uplink shared channels for the mobile station device a4 is two or more, the multiplexer switcher a4415 determines where to output the encoded bits according to a predetermined allocation rule as follows.

In the fourth embodiment, firstly, the multiplexer switcher a4415 selects, among the uplink carrier component numbers n indicated by the shared channel assignment information signal, the uplink carrier component number n of an uplink component carrier allocated with a physical uplink shared channel associated with the smallest modulation level and the smallest encoding rate, based on the modulation schemes and the encoding rates for the physical uplink shared channels allocated to the respective carrier components. The modulation schemes and the encoding rates are previously determined by the base station device b1 and notified to the respective mobile station devices a1.

Specifically, the multiplexer switcher a4415 calculates encoding rates for physical uplink shared channels allocated to the respective uplink carrier components. Then, the multiplexer switcher a4415 selects the uplink carrier component number n of an uplink carrier component associated with the smallest modulation level of the modulation scheme and the smallest encoding rate calculated. Alternatively, the multiplexer switcher a4415 may select the uplink carrier component number n of an uplink carrier component based on information for calculating a modulation scheme and an encoding rate, which is included in the uplink shared channel assignment information and the like transmitted by the base station device b4. In other words, the multiplexer switcher a4415 selects, among multiple uplink carrier components allocated with radio resources, an uplink carrier component allocated with a physical uplink shared channel associated with the smallest modulation level and the smallest encoding rate. The multiplexer switcher a4415 determines to output the encoded bits to one of the data/control information multiplexers a1416 to a1418 which is associated with the selected uplink carrier component.

The multiplexer switcher a4415 outputs the encoded bits to the outputs determined by the above control information allocation switching process.

(Configuration of Reception Processor b43)

Figure 19:
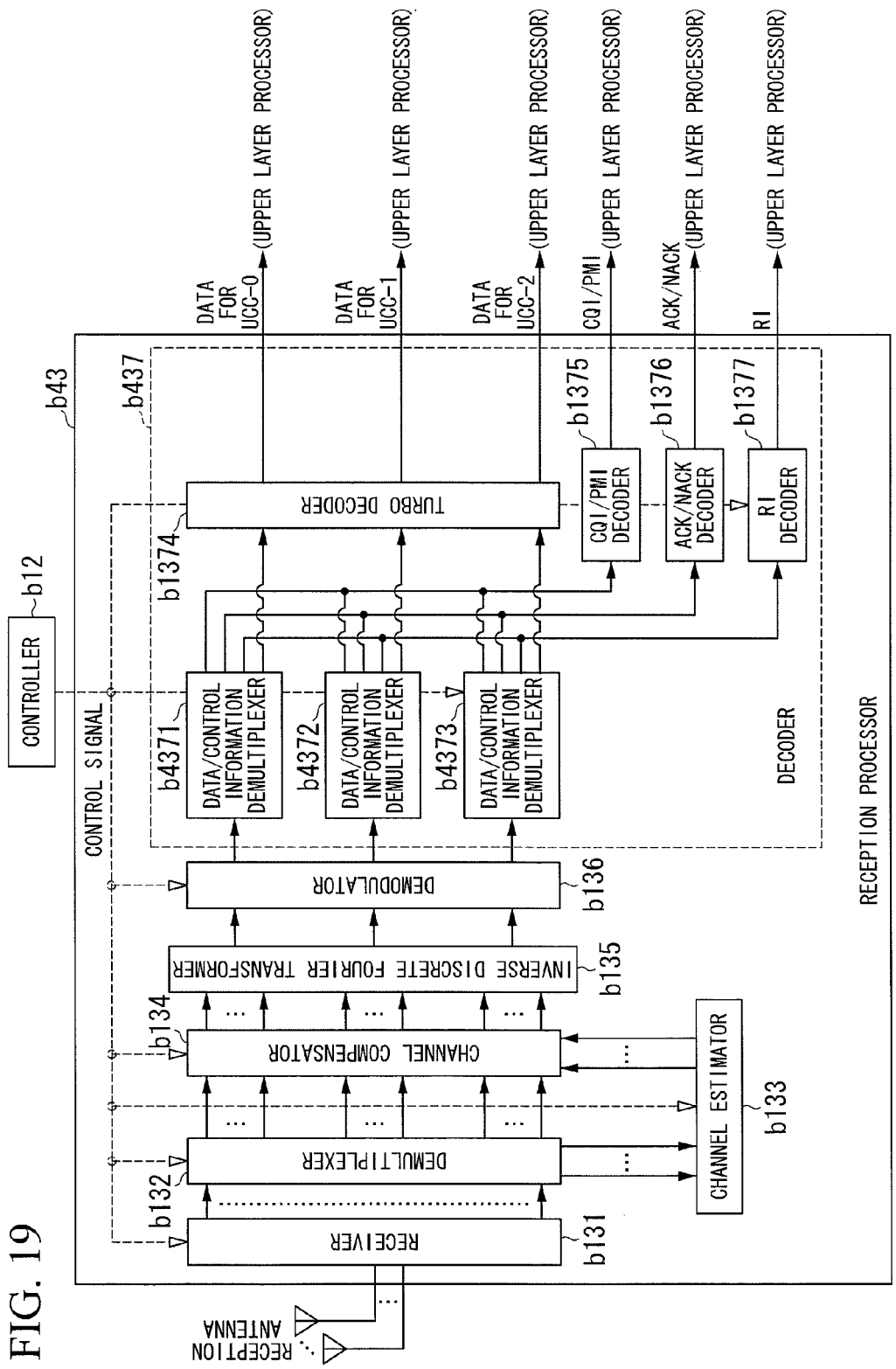
FIG. 19 is a schematic block diagram illustrating a configuration of a reception processor of a base station device according to the fourth embodiment.

FIG. 19 is a configuration of a reception processor b43 of the base station device b4 according to the fourth embodiment. Comparing the reception processor b43 according to the fourth embodiment (shown in FIG. 19) to the reception processor a13 according to the first embodiment (shown in FIG. 8), the data/control information demultiplexers b4371 to b4373 differ. However, functions of other constituent elements (the receiver b131, the demultiplexer b132, the channel estimator b133, the channel compensator b134, the inverse Fourier transformer b135, the demodulator b136, the turbo decoder b1374, the CQI/PMI decoder b1375, the ACK/NACK decoder b1376, and the RI decoder b1377) are the same as those of the first embodiment. Therefore, explanations of the same functions as of the first embodiment are omitted here.

The data/control information demultiplexers b4371 to b4373 are associated with uplink carrier components allocated with the uplink carrier component numbers 0 to 2, respectively. Each of the data/control information demultiplexers b4371 to b4373 performs a control information demultiplexing process to demultiplex encoded bits of signals allocated to associated one of the uplink carrier components. The data/control information demultiplexers b4371 to b4373 have the same functions, and therefore only one (the data/control information demultiplexer b4373) is explained.

Hereinafter, a control information demultiplexing process performed by the data/control information demultiplexer b4373 is explained.

When the shared channel assignment information signal indicates "9," the data/control information demultiplexer b4373 extracts encoded bits of the uplink control information from encoded bits on a physical uplink control channel.

On the other hand, when the shared channel assignment information signal indicates "2" that is one of the uplink carrier component numbers, the data/control information demultiplexer b4373 demultiplexes encoded bits on a physical uplink shared channel according to the allocation shown in FIG. 4A.

When the shared channel assignment information signal indicates two or more of the uplink carrier component numbers n (n=0, 1, 2), the data/control information demultiplexer b4373 performs a process of demultiplexing encoded bits according to the same predetermined allocation rule as used by the mobile station device a4 in the following manner.

Firstly, the data/control information demultiplexer b4373 selects, among the uplink carrier component numbers n indicated by the shared channel allocation information signal, the uplink carrier component number n of an uplink component carrier allocated with a physical uplink shared channel associated with the smallest encoding rate and the smallest modulation level. The data/control information demultiplexer b4373 determines whether or not the selected uplink carrier component number n is "2." When the selected uplink carrier component number n is determined to be "2," the data/control information demultiplexer b4373 demultiplexes the encoded bits on the physical uplink shared channel according to the allocation shown in FIG. 4A. In other words, the data/control information demultiplexer b4373 selects, among multiple uplink component carriers allocated with radio resources, an uplink component carrier allocated with a physical uplink shared channel associated with the smallest encoding rate and the smallest modulation level. When the selected uplink carrier component number n is determined to be "0," the data/control information demultiplexer b4381 demultiplexes the encoded bits on the physical uplink shared channel according to the allocation shown in FIG. 4A. When the selected uplink carrier component number n is determined to be "1," the data/control information demultiplexer b4372 demultiplexes the encoded bits on the physical uplink shared channel according to the allocation shown in FIG. 4A.

The data/control information demultiplexer b4373 outputs the data encoded bits, the CQI/PMI encoded bits, the ACK/NACK encoded bits, and the RI encoded bits to the turbo decoder b1374, the CQI/PMI decoder b1375, the ACK/NACK decoder b1376, and the RI decoder b1377, respectively.

(Structure of Uplink Shared Channel)

Figure 20:
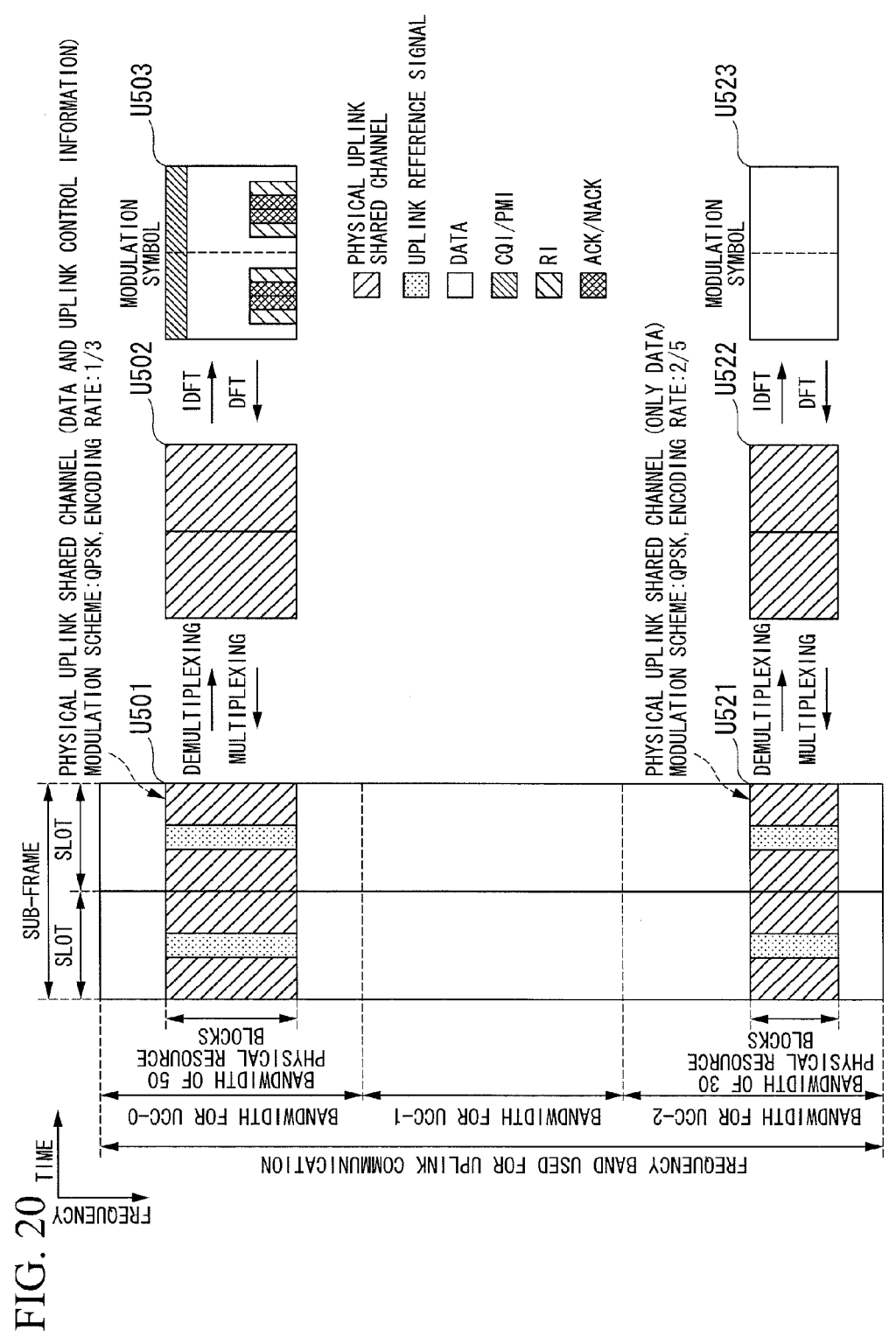

FIG. 20 illustrates an example of a structure of physical uplink shared channels according to the fourth embodiment. In FIG. 20, a horizontal axis denotes a time domain, and a vertical axis denotes a frequency domain. FIG. 20 illustrates a structure of physical uplink shared channels in one subframe. FIG. 20 illustrates a case where the base station device b4 allocates, for the mobile station device a4, physical uplink shared channels to UCC-0 and UCC-2 when performing communication using the carrier aggregation shown in FIG. 2.

Additionally, FIG. 20 shows a case where the encoding rate for the physical uplink shared channel allocated to UCC-0 (for example, 1/3) is larger than the encoding rate for the physical uplink shared channel allocated to UCC-1 (for example, 2/5)

In this case, the multiplexer switcher a4415 of the mobile station device a3 and the data/control information demultiplexers b4371 to b4373 of the base station device b4 select the uplink carrier component numbers "0" indicated by the shared channel assignment information signal.

In FIG. 20, UCC-0 and UCC-2 are allocated with symbols U501 (allocated with a reference numeral U501) on a physical uplink shared channel and symbols U521 (allocated with a reference numeral U521) on a physical uplink shared channel, respectively.

Regarding the symbols U501 and U521, the region hatched with diagonal lines falling from top left to bottom right denotes a symbol allocated onto a physical uplink shared channel. The region hatched with dots denotes an uplink reference signal. The symbols U501 and U521 are the symbols shown in FIG. 4B.

Symbols 5202 allocated with a reference numeral U502 and symbols U522 allocated with a reference numeral U522 denote symbols generated by removing the uplink reference signals from the symbols U501 and U521, respectively.

Symbols U503 allocated with a reference numeral U503 and symbols U523 allocated with a reference numeral U523 denote symbols generated by performing inverse Fourier transform on the symbols U502 and U522, respectively.

In the symbols U503 and U523, a region hatched with diagonal lines crossing in a grid manner denotes a modulation symbol for ACK/NACK. In the symbols U503, the region hatched with diagonal lines rising from bottom left to top right denotes a modulation symbol for CQI or PMI. In the symbols U503, a non-hatched region denotes a modulation symbol for data information.

In the symbols U523, a non-hatched region denotes a modulation symbol for data information.

Thus, according to the fourth embodiment, in the wireless communication system, the mobile station device a4 and the base station device b4 select an uplink carrier component allocated with radio resources for which encoding rate is the smallest. Accordingly, the reception characteristics can be enhanced compared to a case where an uplink component carrier allocated with radio resources for which the encoding rate is larger.

Fifth Embodiment

Hereinafter, a fifth embodiment of the present invention is explained in detail with reference to the accompanying drawings.

The case where the wireless communication system selects one of the uplink carrier components allocated with physical uplink shared channels, which has the highest frequency, has been explained in the first embodiment. In the fifth embodiment, a case where a wireless communication system preferentially selects an uplink carrier component which a base station device has selected and of which the base station device has notified a mobile station device, is explained. The base station device measures a channel quality for each uplink carrier component based on a signal on a physical uplink shared channel, an uplink reference signal, and the like which are received through each uplink carrier component. Then, the base station device selects an uplink carrier component associated with a good channel quality. Then, the base station device notifies the mobile station device of the carrier component number of the selected uplink carrier component.

Comparing the wireless communication system of the fifth embodiment to the wireless communication system of the first embodiment, a transmission processor of a mobile station device and a reception processor of a base station device differ. However, the configurations and functions of other constituent elements do not differ from those of the first embodiment. Therefore, explanations of the same functions as of the first embodiment are omitted here. Hereinafter, a mobile station device according to the fifth embodiment is referred to as a mobile station device a5, and a base station device according to the fifth embodiment is referred to as a base station device b5.

(Configuration of Transmission Processor a54)

Figure 21:
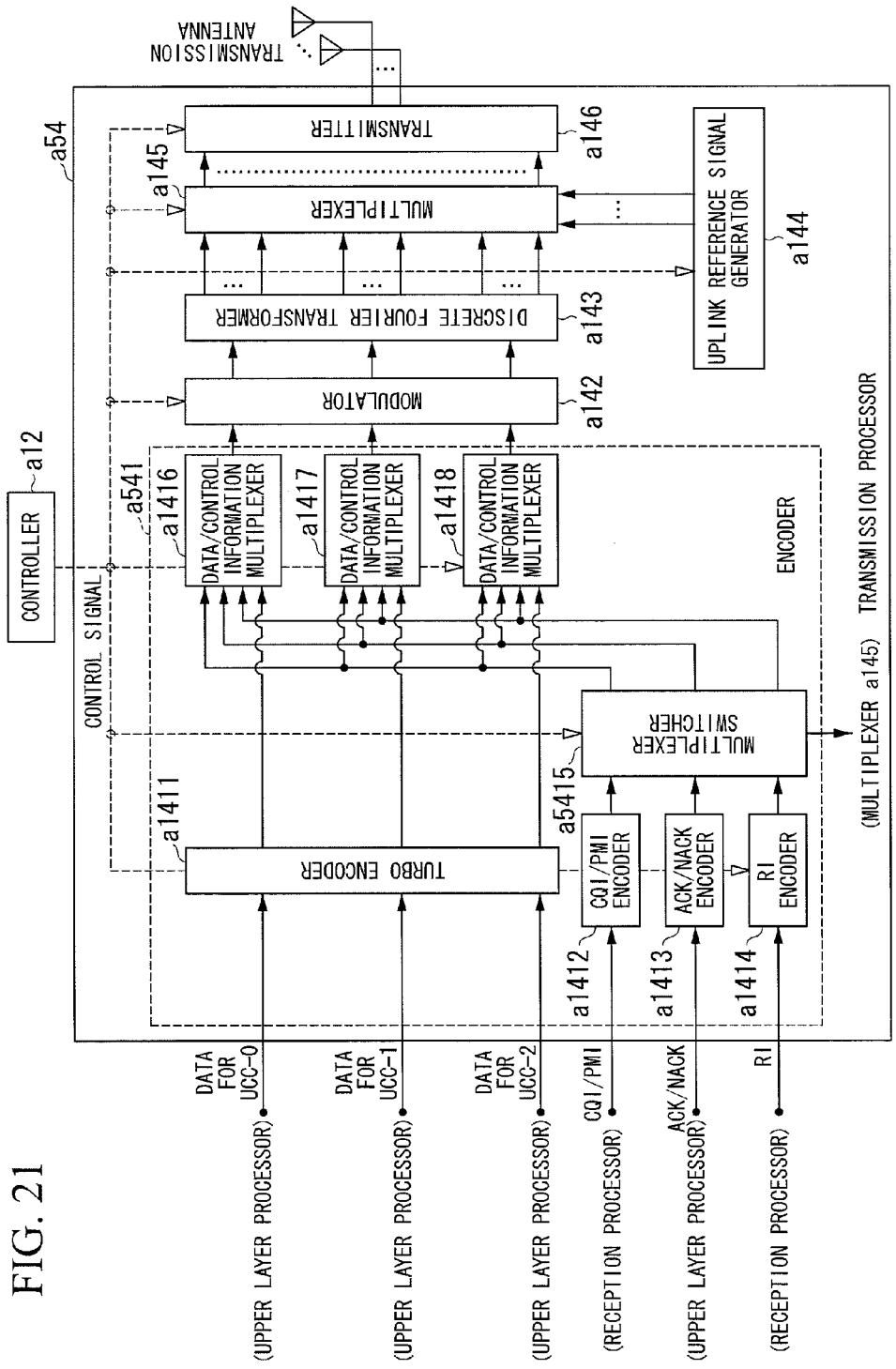
FIG. 21 is a schematic block diagram illustrating a configuration of a transmission processor of a mobile station device according to a fifth embodiment of the present invention.

FIG. 21 is a schematic block diagram illustrating a configuration of a transmission processor a54 of the mobile station device a5 according to the fifth embodiment of the present invention. Comparing the transmission processor a54 according to the second embodiment (shown in FIG. 21) to the transmission processor a54 according to the first embodiment (shown in FIG. 6), a multiplexer switcher a5415 differs. However, functions of other constituent elements (the turbo encoder a1411, the CQI/PMI encoder a1412, the ACK/NACK encoder a1413, the RI encoder a1414, the data/control information multiplexers a1416 to a1418, the modulator a142, the discrete Fourier transformer a143, the multiplexer a145, the uplink reference signal generator a144, and the transmitter a145) are the same as of the first embodiment. Therefore, explanations of the same functions as of the first embodiment are omitted here.

Hereinafter, a control information allocation switching process performed by the multiplexer switcher a5415 is explained.

When the shared channel assignment information signal indicates "9," the multiplexer switcher a5415 determines to output the encoded bits to the multiplexer a145.

On the other hand, when the shared channel assignment information signal indicates a number other than "9," the multiplexer switcher a5415 selects the uplink carrier component number n of an uplink carrier component previously notified by the base station device b5. In other words, the multiplexer switcher a5415 preferentially selects, among multiple uplink carrier components, an uplink carrier component previously notified by the base station device b5. The multiplexer switcher a5415 determines to output the encoded bits to one of the data/control information multiplexers a1416 to a1418 which is associated with the uplink carrier component notified by the base station device b5.

The multiplexer switcher a5415 outputs the encoded bits to the outputs determined by the above control information allocation switching process.

(Configuration of Base Station Device b1)

Figure 22:
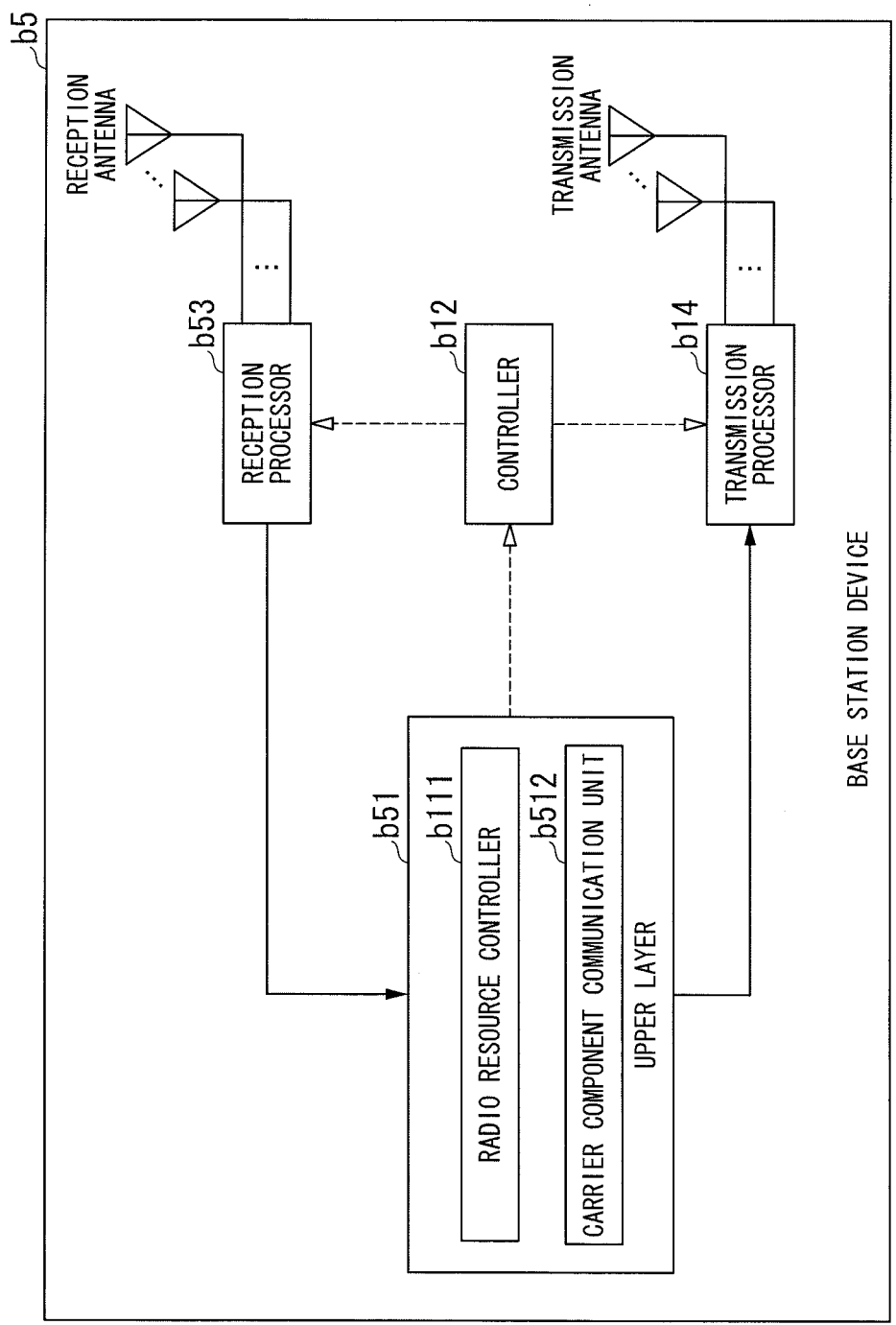
FIG. 22 is a schematic block diagram illustrating a configuration of a base station device according to the fifth embodiment.

FIG. 22 is a schematic block diagram illustrating a configuration of the base station device b5 according to the fifth embodiment.

Comparing the base station device b5 according to the fifth embodiment (shown in FIG. 22) to the base station device b1 according to the first embodiment (shown in FIG. 7), a carrier component notifier b512 (carrier component selector) of an upper layer b51 and a reception processor b53 differ. However, functions of other constituent elements (the radio resource controller b111, the controller b12, and the transmission processor b14) are the same as of the first embodiment. Therefore, explanations of the same functions as of the first embodiment are omitted here.

The carrier component notifier 512 selects an uplink carrier component associated with a good channel quality, based on channel quality information for each carrier component measured based on signals on the physical uplink shared channel, an uplink reference signal, and the like which are received through each uplink carrier component.

The carrier component notifier b512 notifies the mobile station device a5 of the uplink carrier component number n of the selected uplink carrier component through the transmission processor b14. Additionally, the carrier component notifier b512 outputs the uplink carrier component number n of the selected uplink carrier component to the reception processor b53 through the controller b12.

(Configuration of Reception Processor b43)

Figure 23:
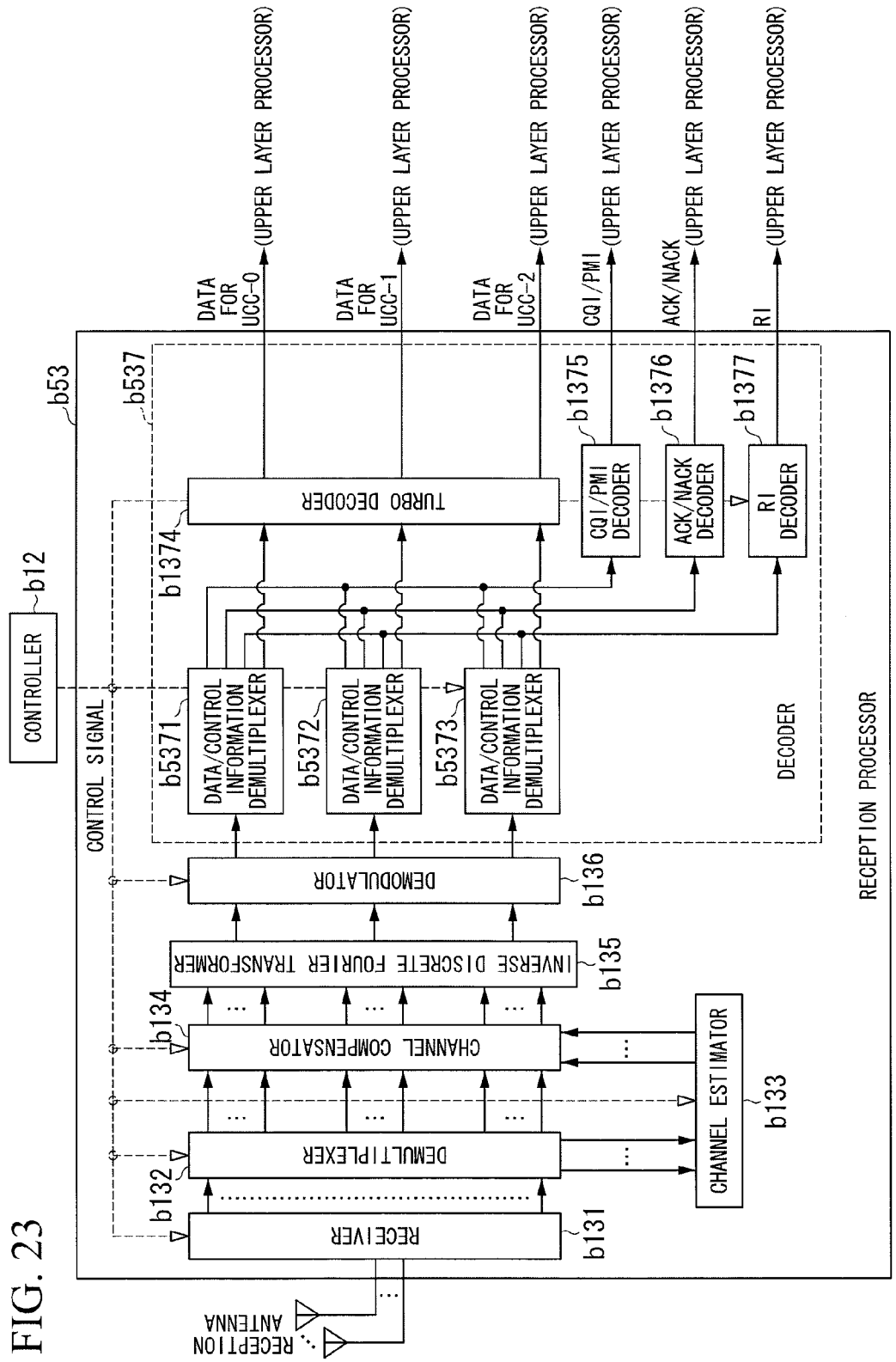
FIG. 23 is a schematic block diagram illustrating a configuration of a reception processor of the base station device according to the fifth embodiment.

FIG. 23 is a configuration of a reception processor b53 of the base station device b5 according to the fifth embodiment. Comparing the reception processor b53 according to the fifth embodiment (shown in FIG. 19) to the reception processor b13 according to the first embodiment (shown in FIG. 8), the data/control information demultiplexers b5371 to b5373 differ. However, functions of other constituent elements (the receiver b131, the demultiplexer b132, the channel estimator b133, the channel compensator b134, the inverse Fourier transformer b135, the demodulator b136, the turbo decoder b1374, the CQI/PMI decoder b1375, the ACK/NACK decoder b1376, and the RI decoder b1377) are the same as those of the first embodiment. Therefore, explanations of the same functions as of the first embodiment are omitted here.

The data/control information demultiplexers b5371 to b5373 are associated with uplink carrier components allocated with the uplink carrier component numbers 0 to 2, respectively. Each of the data/control information demultiplexers b5371 to b5373 performs a control information demultiplexing process to demultiplex encoded bits of signals allocated to associated one of the uplink carrier components. The data/control information demultiplexers b5371 to b5373 have the same functions, and therefore only one (the data/control information demultiplexer b5373) is explained.

Hereinafter, a control information demultiplexing process performed by the data/control information demultiplexer b5373 is explained.

When the shared channel assignment information signal indicates "9," the data/control information demultiplexer b5373 extracts encoded bits of the uplink control information from encoded bits on a physical uplink control channel.

On the other hand, when the shared channel assignment information signal indicates a number other than "9," the data/control information demultiplexer b5373 determines whether or not the selected uplink carrier component number n received from the carrier component notifier b512 is "2." When the selected uplink carrier component number n is determined to be "2," the data/control information demultiplexer b5373 demultiplexes the encoded bits on the physical uplink shared channel according to the allocation shown in FIG. 4A. In other words, the data/control information demultiplexer b5373 preferentially selects an uplink carrier component previously notified by the base station device a5. When the selected uplink carrier component number n is determined to be "0," the data/control information demultiplexer b5381 demultiplexes the encoded bits on the physical uplink shared channel according to the allocation shown in FIG. 4A. When the selected uplink carrier component number n is determined to be "1," the data/control information demultiplexer b5372 demultiplexes the encoded bits on the physical uplink shared channel according to the allocation shown in FIG. 4A.

The data/control information demultiplexer b5373 outputs the data encoded bits, the CQI/PMI encoded bits, the ACK/NACK encoded bits, and the RI encoded bits to the turbo decoder b1374, the CQI/PMI decoder b1375, the ACK/NACK decoder b1376, and the RI decoder b1377, respectively.

(Structure of Uplink Shared Channel)

Figure 24:
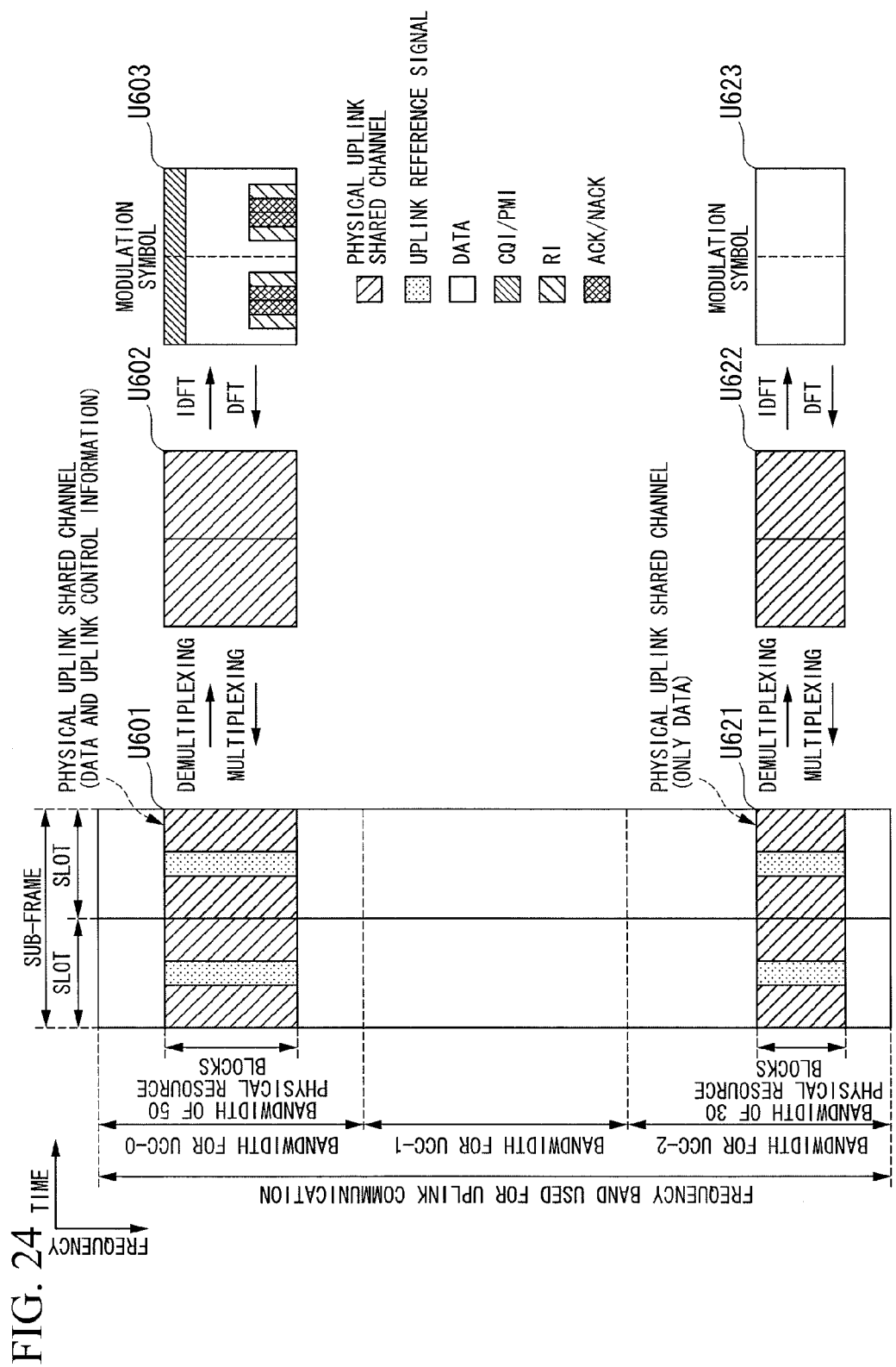
FIG. 24 illustrates an example of a structure of physical uplink shared channels according to the fifth embodiment.

FIG. 24 illustrates an example of a structure of physical uplink shared channels according to the fifth embodiment. In FIG. 24, a horizontal axis denotes a time domain, and a vertical axis denotes a frequency domain. FIG. 24 illustrates a structure of physical uplink shared channels in one subframe. FIG. 24 illustrates a case where the base station device b5 allocates, for the mobile station device a5, physical uplink shared channels to UCC-0 and UCC-2 when performing communication using the carrier aggregation shown in FIG. 2.

Additionally, FIG. 24 shows a case where the base station device b5 selects UCC-0 as an uplink carrier component to be preferentially allocated with uplink control information, and notifies the mobile station device a5 of "0" as the uplink carrier component number of the uplink carrier component to be preferentially allocated with the uplink control information.

In this case, the multiplexer switcher a5415 of the mobile station device a5 and the data/control information demultiplexers b5371 to b5373 of the base station device b5 select the uplink carrier component numbers "0" indicated by the shared channel assignment information signal.

In FIG. 24, UCC-0 and UCC-2 are allocated with symbols U601 (allocated with a reference numeral U601) on a physical uplink shared channel and symbols U621 (allocated with a reference numeral U621) on a physical uplink shared channel, respectively.

Regarding the symbols U601 and U621, the region hatched with diagonal lines falling from top left to bottom right denotes a symbol allocated onto a physical uplink shared channel. The region hatched with dots denotes an uplink reference signal. The symbols U601 and U621 are the symbols shown in FIG. 4B.

Symbols U602 allocated with a reference numeral U602 and symbols U622 allocated with a reference numeral U622 denote symbols generated by removing the uplink reference signals from the symbols U601 and U621, respectively.

Symbols U603 allocated with a reference numeral U603 and symbols U623 allocated with a reference numeral U623 denote symbols generated by performing inverse Fourier transform on the symbols U602 and U622, respectively.

In the symbols U603, a region hatched with diagonal lines crossing in a grid manner denotes a modulation symbol for ACK/NACK. In the symbols U603, the region hatched with diagonal lines rising from bottom left to top right denotes a modulation symbol for CQI or PMI. In the symbols U603, a non-hatched region denotes a modulation symbol for data information.

In the symbols U623, a non-hatched region denotes a modulation symbol for data information.

Thus, according to the fifth embodiment, in the wireless communication system, the mobile station device a5 and the base station device b5 select an uplink carrier component associated with a good channel quality. Accordingly, the reception characteristics for uplink control information can be enhanced compared to a case where an uplink carrier component associated with a bad channel quality is selected.

It has been explained in the first embodiment that the mobile station device a1 and the base station device b1 select, among physical uplink shared channels assigned, an uplink carrier component having the highest frequency, as an uplink carrier component to be allocated with signals of uplink control information. However, the present invention is not limited thereto, and an uplink carrier component having the lowest frequency or an uplink carrier component having the center frequency may be selected as an uplink carrier component to be allocated with signals of uplink control information.

Additionally, an uplink carrier component to be allocated with signals of uplink control information may be selected as an uplink carrier component to be allocated with signals of uplink control information, in predetermined order of priorities, such as in order of the demodulating or decoding process performed by the base station device b1 on signals on an uplink carrier component. For example, when a physical uplink shared channel of an uplink carrier component to be first decoded by the base station device b1, the base station device b1 can quickly decode the uplink control information and quickly control communication. The physical uplink shared channel of the uplink carrier component to be first decoded by the base station device b1 may be a physical uplink shared channel that is associated with a carrier component having the highest or lowest frequency.

It has been explained that the mobile station device a2 and the base station device b2 sequentially select, as uplink carrier components to be allocated with signals of uplink control information, M uplink carrier components in order of decreasing frequency from the uplink carrier component having the highest frequency. However, the present invention is not limited thereto. For example, the mobile station device a2 and the base station device b2 may sequentially select, as uplink carrier components to be allocated with signals of uplink control information, M uplink carrier components in order of increasing frequency from the uplink carrier component having the lowest frequency. Additionally, for example, the mobile station device a2 and the base station device b2 may sequentially select, as uplink carrier components to be allocated with signals of uplink control information, M uplink carrier components in order of the demodulating or decoding process performed by the base station device b2 on signals on an uplink carrier component. For example, M uplink carrier components may be sequentially selected in order of the decoding process performed by the base station device b2 from an uplink carrier component to be first subjected to the decoding process, as uplink carrier components to be allocated with signals of uplink control information. Further, for example, M uplink carrier components may be sequentially selected in order of increasing amount of radio resources assigned to an uplink carrier component by the base station device b2, as uplink carrier components to be allocated with signals of uplink control information.

Moreover, in the second embodiment, the number of uplink carrier components selected by the mobile station device a2 and the base station device b2 may be increased to two or five. In each of the above embodiments, the number of uplink carrier components is not limited to three, and may be four or more.

It has been explained in the third embodiment that the mobile station device a3 and the base station device b3 select, among physical uplink shared channels respectively assigned to uplink carrier components, an uplink carrier component having the largest amount of radio resources, as an uplink carrier component to be allocated with signals of uplink control information. In has been explained in the fourth embodiment that the mobile station device a3 and the base station device b4 select, among physical uplink shared channels respectively assigned to uplink carrier components, an uplink carrier component associated with the smallest encoding rate and the smallest modulation level, as an uplink carrier component to be allocated with signals of uplink control information. However, the present invention is not limited thereto. For example, an uplink carrier component to be allocated with signals of uplink control information may be selected based on the amount of radio resources, an encoding rate, and a modulation scheme of a physical uplink shared channel assigned to an uplink carrier component.

Additionally, an uplink carrier component to be allocated with signals of uplink control information may be selected based on the amount of data information of a physical uplink shared channel, which can be calculated from the amount of radio resources, an encoding rate, and a modulation scheme of a physical uplink shared channel assigned to an uplink carrier component. Accordingly, without allocating signals of uplink control channel to a physical uplink shared channel associated with the large resource amount and a high encoding rate, a physical uplink shared channel associated with the small resource amount and a low encoding rate, the amount of radio resources, an encoding rate, and the modulation level are comprehensively evaluated, and a physical uplink shared channel that achieves better characteristics of signals of the uplink control information can be selected.

It has been explained in the fourth embodiment that the mobile station device a4 and the base station device b4 select, among physical uplink shared channels respectively assigned to uplink carrier components, an uplink carrier component associated with the smallest modulation level and the lowest encoding rate, as an uplink carrier component to be allocated with signals of uplink control information. However, the present invention is not limited thereto. For example, an uplink carrier component associated with the lowest encoding rate may be selected among physical uplink shared channels respectively assigned to uplink carrier components. Additionally, an uplink carrier component associated with the smallest modulation level may be selected. Accordingly, the configurations of the base station device b4 and the mobile station device a4 can be simplified.

Further, the mobile station device a4 and the base station device b4 may first select, among physical uplink shared channels respectively assigned to uplink carrier components, an uplink carrier component associated with the smallest modulation level, and then select an uplink carrier component associated with the lowest encoding rate as an uplink carrier component to be allocated with signals of uplink control information when there are multiple uplink carrier components associated with the smallest modulation level. Moreover, the mobile station device a4 and the base station device b4 may first select, among physical uplink shared channels respectively assigned to uplink carrier components, an uplink carrier component associated with the lowest encoding rate, and then select an uplink carrier component associated with the smallest modulation level as an uplink carrier component to be allocated with signals of uplink control information when there are multiple uplink carrier components associated with the lowest encoding rate.

It has been explained in the fifth embodiment that the mobile station device a5 and the base station device b5 select, among physical uplink shared channels respectively assigned to uplink carrier components, an uplink carrier component which the base station device b5 selects and notifies the mobile station device of, as an uplink carrier component to be allocated with signals of uplink control information. However, the present invention is not limited thereto. For example, when the mobile station device b5 does not allocate a physical uplink shared channel to an uplink carrier component previously notified to the mobile station device a5, but only to an uplink carrier component other than one previously notified to the mobile station device a5, the first embodiment, the second embodiment, the third embodiment, or the fourth embodiment may be used without using the fifth embodiment. Thereby, there is no need to absolutely assign a physical uplink shared channel to the uplink carrier component which the base station device b5 selects and notifies the mobile station device a5 of.

Additionally, in each of the above embodiments, the base station device b1 to b5 may measure power of signals allocated to radio resources of the physical uplink shared channel assigned to the mobile station device a1 to a5, and selects an uplink carrier component when the measured power becomes equal to or more than a predetermined value. Thereby, it can be determined that the mobile station device a1 to a5 properly decode downlink control information (uplink shared channel assignment information) indicating assignment of radio resources of a physical uplink shared channel. Further, when the decoding of the downlink control information (uplink shared channel assignment information) fails, errors are prevented from occurring due to the fact that uplink control information is not allocated according to a predetermined rule.

Uplink communication from the mobile station devices a1 to a5 to the base station devices b1 to b5 has been explained in each of the above embodiments. However, the present invention is not limited thereto, and may be applied to downlink communication from the base station devices b1 to b5 to the mobile station devices a1 to a5. In this case, the mobile station device has the configuration and function of the base station devices b1 to b5, and the base station device has the configuration and function of the mobile station device.

Programs related to the present invention, which are operated by the base station device and the mobile station device, may be programs that control CPU (Central Processing Unit) and the like (programs that function a computer). Information used by these devices is temporarily stored in RAM (Random Access Memory) when processed. Then, the information is stored in various ROM such as Flash ROM (Read Only Memory) and HDD (Hard Disk Drive), and is read, modified, and written by CPU according to need.

A computer may implement part of the mobile station devices a1 to a3 and the base station devices b1 to b3 of the above embodiments, such as: the upper layer processor a11; the controller a12; the reception processor a13; the radio resource controller a111; the turbo encoder a1411; the CQI/PMI encoder a1412; the ACK/NACK encoder a1413; the RI encoder a1414; the multiplexer switchers a1415, a2415, a3415, a4415, and a5415; the data/control information multiplexers a1416 to a1418; the modulator a142; the discrete Fourier transformer a143; the uplink reference signal generator a144; the multiplexer a145; the transmitter a145; the upper layer processor b11; the controller b12; the transmission processor b14; the radio resource controller b111; the carrier component notifier 512; the receiver b131; the demultiplexer b132; the channel estimator b133; the channel compensator b134; the inverse discrete Fourier transformer b135; the demodulator b136; the data/control information demultiplexers b1371 to b1373, b2371 to b2373, b3371 to b3373, b4371 to b4373, and b5371 to b5373; the turbo decoder b1374; the CQI/PMI decoder b1375; the ACK/NACK decoder b1376; and the RI decoder b1377. In this case, the above control functions may be implemented by recording a program for implementing the control functions on a computer readable recording medium, and causing a computer system to read and execute the program recorded. The "computer system" is a computer system built in the mobile station devices a1 to a3 or the base station devices b1 to b3, and includes an OS and hardware such as peripheral devices. Additionally, the "computer readable recording medium" includes a portable medium such as a flexible disc, a magneto-optical disc, a ROM and a CD-ROM, and a storage device such as a hard disk built in the computer system. The "computer readable recording medium" may include a medium that stores a program for a short period of time, such as a communication line used when a program is transmitted via a network such as the Internet or a communication line such as a telephone line. Additionally, the "computer readable recording medium" may include a medium that stores a program for a predetermined period of time, such as a volatile memory built in a computer system serving as a server or client when the program is transmitted via a network such as the Internet or a communication line such as a telephone line. Additionally, the program may be one for implementing part of the aforementioned functions. Further, the program may be one that can implement the aforementioned functions in combination with a program already recorded on the computer system.

An embodiment of the present invention has been explained above with reference to the accompanying drawings. However, a specific configuration thereof is not limited thereto, and various design modification and the like can be made without departing from the scope of the present invention.

INDUSTRIAL APPLICABILITY

The present invention is suitable to be used for a mobile station device related to a mobile communication, a wireless communication system, and a similar technology. Control information and data information allocated onto radio resources assigned to each of multiple carrier components can be communicated reliably.

DESCRIPTION OF REFERENCE NUMERALS

A1 to A3, and a1 to a5: mobile station device (first communication device)
B1, and b1 to b5: base station device (second communication device)
a11: upper layer processor
a12: controller
a13: reception processor
a14, a24, a34, a44, and a54: transmission processor
a111: radio resource controller
a141, a241, a341, a441, and a541: encoder
a142: modulator
a143: discrete Fourier modulator
a144: uplink reference signal generator
a145: multiplexer
a145: transmitter
a1411: turbo encoder
a1412: CQI/PMI encoder
a1413: ACK/NACK encoder
a1414: RI encoder
a1415, a2415, a3415, a4415, and a5415: multiplexer switcher (carrier component selector)
a1416 to a1418: data/control information multiplexer
b11 and b51: upper layer processor
b12 controller
b13, b23, b33, b43, and b53: reception processor
b14: transmission processor
b111: radio resource controller
b512: carrier component notifier (carrier component selector)
b131: receiver
b132: demultiplexer
b133: channel estimator
b134: channel compensator
b135: inverse Fourier transformer
b136: demodulator
b1371 to b1373, b2371 to b2373, and b3371 to b3373: data/control information demultiplexer
b1374: turbo decoder
b1375: CQI/PMI decoder
b1376: ACK/NACK decoder
b1377: RI decoder

The invention claimed is:

1. A mobile station device comprising:
a receiver configured to and/or programmed to receive one or more first physical downlink shared channels on one or more first downlink component carriers and a plurality of second physical downlink shared channels on a plurality of second downlink component carriers; and
a transmitter configured to and/or programmed to transmit in a subframe,
a first physical uplink channel with first ACK/NACK in a first uplink component carrier, the first ACK NACK being provided for the one or more first physical downlink shared channels received on the one or more first downlink component carriers, and
a second physical uplink channel with second ACK/NACK in a second uplink component carrier, the second ACK/NACK being provided for the plurality of second physical downlink shared channels received on the plurality of second downlink component carriers, wherein
the second uplink component carrier is an uplink component carrier with a minimum component carrier number among component carrier numbers corresponding to a plurality of uplink component carriers, and
the plurality of uplink component carriers are numbered respectively.

2. The mobile station device according to claim 1, further comprising:
a determination circuit configured to and/or programmed to determine based on information received from a base station device,
the first uplink component carrier for a transmission of the first physical uplink channel with the first ACK/NACK related to the one or more first physical downlink shared channel received on the one or more first downlink component carrier, and
the second uplink component carrier for a transmission of the second physical uplink channel with the second ACK/NACK related to the plurality of second physical downlink shared channels received on the plurality of second downlink component carriers.

3. A base station device comprising:
a transmitter configured to and/or programmed to transmit one or more first physical downlink shared channels on one or more first downlink component carriers and a plurality of second physical downlink shared channels on a plurality of second downlink component carriers; and
a receiver configured to and/or programmed to receive in a subframe,
a first physical uplink channel with first ACK/NACK in a first uplink component carrier, the first ACK/NACK being provided for the one or more first physical downlink shared channels received on the one or more first downlink component carriers, and
a second physical uplink channel with second ACK/NACK in a second uplink component carrier, the second ACK/NACK being provided for the plurality of second physical downlink shared channels received on the plurality of second downlink component carriers, wherein
the second uplink component carrier is an uplink component carrier with a minimum component carrier number among component carrier numbers corresponding to a plurality of uplink component carriers, and
the plurality of uplink component carriers are numbered respectively.

4. The base station device according to claim 3, further comprising:
a determination circuit configured to and/or programmed to determine based on information transmitted to a mobile station device,
the first uplink component carrier for a reception of the first physical uplink channel with the first ACK/NACK related to the one or more first physical downlink shared channel transmitted on the one or more first downlink component carrier, and
the second uplink component carrier for a reception of the second physical uplink channel with the second ACK/NACK related to the plurality of second physical downlink shared channels received on the plurality of second downlink component carriers.

5. A communication method used in a mobile station device, the communication method comprising:
receiving one or more first physical downlink shared channels on one or more first downlink component carriers and a plurality of second physical downlink shared channels on a plurality of second downlink component carriers; and
transmitting in a subframe, a first physical uplink channel with first ACK/NACK in a first uplink component carrier, the first ACK/NACK being provided for the one or more first physical downlink shared channels received on the one or more first downlink component carriers, and a second physical uplink channel with second ACK/NACK in a second uplink component carrier, the second ACK/NACK being provided for the plurality of second physical downlink shared channels received on the plurality of second downlink component carriers, wherein the second uplink component carrier is an uplink component carrier with a minimum component carrier number among component carrier numbers corresponding to a plurality of uplink component carriers, and the plurality of uplink component carriers are numbered respectively.

6. The communication method according to claim 5, further comprising:

determining based on information received from a base station device, the first uplink component carrier for a transmission of the first physical uplink channel with the first ACK/NACK related to the one or more first physical downlink shared channel received on the one or more first downlink component carrier, and the second uplink component carrier for a transmission of the second physical uplink channel with the second ACK/NACK related to the plurality of second physical downlink shared channels received on the plurality of second downlink component carriers.

7. A communication method used in a base station device, the communication method comprising:

transmitting one or more first physical downlink shared channels on one or more first downlink component carriers and a plurality of second physical downlink shared channels on a plurality of second downlink component carriers, and receiving in a subframe, a first physical uplink channel with first ACK/NACK in a first uplink component carrier, the first ACK/NACK being provided for the one or more first physical downlink shared channels received on the one or more first downlink component carriers, and a second physical uplink channel with second ACK/NACK in a second uplink component carrier, the second ACK/NACK being provided for the plurality of second physical downlink shared channels received on the plurality of second downlink component carriers, wherein the second uplink component carrier is an uplink component carrier with a minimum component carrier number among component carrier numbers corresponding to a plurality of uplink component carriers, and the plurality of uplink component carriers are numbered respectively.

8. The communication method according to claim 7, further comprising:

determining based on information transmitted to a mobile station device, the first uplink component carrier for a reception of the first physical uplink channel with the first ACK/NACK related to the one or more first physical downlink shared channel transmitted on the one or more first downlink component carrier, and the second uplink component carrier for a reception of the second physical uplink channel with the second ACK/NACK related to the plurality of second physical downlink shared channels received on the plurality of second downlink component carriers.

* * * * *